United States Patent
Perez et al.

(10) Patent No.: US 9,519,640 B2
(45) Date of Patent: Dec. 13, 2016

(54) INTELLIGENT TRANSLATIONS IN PERSONAL SEE THROUGH DISPLAY

(75) Inventors: Kathryn Stone Perez, Kirkland, WA (US); John Clavin, Seattle, WA (US); Kevin A. Geisner, Mercer Island, WA (US); Stephen G. Latta, Seattle, WA (US); Brian J. Mount, Seattle, WA (US); Arthur C. Tomlin, Bellevue, WA (US); Adam G. Poulos, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 13/464,945

(22) Filed: May 4, 2012

(65) Prior Publication Data

US 2013/0293577 A1 Nov. 7, 2013

(51) Int. Cl.
*G06T 19/00* (2011.01)
*G06F 17/28* (2006.01)
(Continued)

(52) U.S. Cl.
CPC ........... *G06F 17/289* (2013.01); *G02B 27/017* (2013.01); *G06F 1/163* (2013.01); *G06T 19/006* (2013.01);
(Continued)

(58) Field of Classification Search
CPC .... G06F 3/013; G06F 17/289; G06Q 30/0261; G02B 2027/014; G02B 2027/017; G02B 2027/0172; G02B 2027/0176; G02B 2027/0178; G02B 2027/0187; G02B 27/0093; G02B 27/01; G02B 27/017
(Continued)

(56) References Cited

U.S. PATENT DOCUMENTS 6,417,969 B1 * 7/2002 DeLuca et al. ............... 359/630
7,038,699 B2 5/2006 Sato et al.
(Continued)

FOREIGN PATENT DOCUMENTS

CA 2750287 A1 11/2011
JP H 10-123450 A 5/1998
(Continued)

OTHER PUBLICATIONS

Lee, et al.,"Combining Context-Awareness with Wearable Computing for Emotion-based Contents Service", In Proceedings of International Journal of Advanced Science and Technology, vol. 22, Sep. 2010, pp. 12.
(Continued)

*Primary Examiner* — Michael J Cobb
(74) *Attorney, Agent, or Firm* — Brianna Hinojosa-Flores; Judy Yee; Micky Minhas

(57) ABSTRACT

A see-through, near-eye, mixed reality display apparatus for providing translations of real world data for a user. A wearer's location and orientation with the apparatus is determined and input data for translation is selected using sensors of the apparatus. Input data can be audio or visual in nature, and selected by reference to the gaze of a wearer. The input data is translated for the user relative to user profile information bearing on accuracy of a translation and determining from the input data whether a linguistic translation, knowledge addition translation or context translation is useful.

13 Claims, 24 Drawing Sheets

(51) Int. Cl.
  *G06F 1/16* (2006.01)
  *G02B 27/01* (2006.01)

(52) U.S. Cl.
  CPC . *G02B 2027/014* (2013.01); *G02B 2027/0178* (2013.01); *G02B 2027/0187* (2013.01)

(58) Field of Classification Search
  USPC .......... 345/7-9, 419, 633; 359/630; 382/103
  See application file for complete search history.

(56) References Cited

U.S. PATENT DOCUMENTS

| | | | |
|---|---|---|---|
| 7,124,425 B1* | 10/2006 | Anderson et al. | 725/68 |
| 7,199,301 B2 | 4/2007 | Prittwitz | |
| 7,308,112 B2 | 12/2007 | Fujimura et al. | |
| 7,372,451 B2* | 5/2008 | Dempski | 345/158 |
| 7,587,747 B2 | 9/2009 | Maguire, Jr. | |
| 7,632,187 B1 | 12/2009 | Farley et al. | |
| 7,860,705 B2* | 12/2010 | Afify et al. | 704/3 |
| 8,188,880 B1 | 5/2012 | Chi et al. | |
| 8,223,088 B1* | 7/2012 | Gomez | G06F 3/03547 345/7 |
| 8,468,149 B1* | 6/2013 | Lung et al. | 707/713 |
| 2003/0133599 A1* | 7/2003 | Tian | G06K 9/00308 382/118 |
| 2004/0210444 A1 | 10/2004 | Arenburg et al. | |
| 2005/0038662 A1* | 2/2005 | Sarich | G06F 17/289 704/277 |
| 2005/0060365 A1* | 3/2005 | Robinson et al. | 709/203 |
| 2006/0009702 A1 | 1/2006 | Iwaki et al. | |
| 2006/0105838 A1* | 5/2006 | Mullen | 463/31 |
| 2006/0149558 A1* | 7/2006 | Kahn et al. | 704/278 |
| 2006/0206310 A1* | 9/2006 | Ravikumar et al. | 704/9 |
| 2008/0002262 A1 | 1/2008 | Chirieleison | |
| 2008/0055194 A1 | 3/2008 | Baudino et al. | |
| 2008/0133336 A1 | 6/2008 | Altman et al. | |
| 2008/0221862 A1* | 9/2008 | Guo | G06F 17/289 704/2 |
| 2008/0243473 A1* | 10/2008 | Boyd et al. | 704/2 |
| 2009/0048820 A1 | 2/2009 | Buccella | |
| 2009/0293012 A1* | 11/2009 | Alter et al. | 715/810 |
| 2010/0079356 A1 | 4/2010 | Hoellwarth | |
| 2010/0103196 A1 | 4/2010 | Kumar et al. | |
| 2010/0153389 A1* | 6/2010 | Angell et al. | 707/736 |
| 2010/0238161 A1* | 9/2010 | Varga et al. | 345/419 |
| 2010/0318360 A1* | 12/2010 | Uehara | G10L 13/027 704/260 |
| 2010/0328492 A1* | 12/2010 | Fedorovskaya et al. | 348/231.2 |
| 2011/0018903 A1 | 1/2011 | Lapstun et al. | |
| 2011/0040155 A1* | 2/2011 | Guzak et al. | 600/300 |
| 2011/0161875 A1* | 6/2011 | Kankainen | 715/810 |
| 2011/0221656 A1 | 9/2011 | Haddick et al. | |
| 2011/0310120 A1* | 12/2011 | Narayanan | 345/633 |
| 2012/0075168 A1* | 3/2012 | Osterhout et al. | 345/8 |
| 2012/0092328 A1 | 4/2012 | Flaks et al. | |
| 2012/0143693 A1 | 6/2012 | Chung et al. | |
| 2013/0038510 A1 | 2/2013 | Brin et al. | |
| 2013/0044042 A1 | 2/2013 | Olsson et al. | |
| 2013/0095460 A1* | 4/2013 | Bishop | G09B 5/06 434/308 |
| 2013/0124185 A1* | 5/2013 | Sarr et al. | 704/2 |

FOREIGN PATENT DOCUMENTS

| | | |
|---|---|---|
| WO | 2011158010 A1 | 12/2011 |
| WO | WO2012/158047 A1 | 11/2012 |

OTHER PUBLICATIONS

Mura, Gökhan, "Wearable Technologies for Emotion Communication", Retrieved on: Jun. 26, 2012, Available at: http://jfa.arch.metu.edu.tr/archive/0258-5316/2008/cilt25/sayi_1/153-161.pdf.

Harrison, et al., "Using Multi-modal Sensing for Human Activity Modeling in the RealWorld", Retrieved on: Jun. 26, 2012, Available at: http://cs.gmu.edu/~jpsousa/classes/895/readings/0463.pdf.

Ball, et al., "Emotion and Personality in a Conversational Character", Retrieved on: Jun. 26, 2012, Available at: http://research.microsoft.com/pubs/68709/wecc-98.doc.

"Meeting Georgios Papastefanou at the WTconference 2012", Retrieved on: Jun. 26, 2012, Available at: http://www.wearable-technologies.com/meeting-georgios-papastefanou-at-the-wtconference-2012.

U.S. Appl. No. 13/665,477, filed Oct. 31, 2012.

International Search Report & The Written Opinion dated Aug. 1, 2013, International Application No. PCT/US2013/039431.

English Abstract of Japanese Publication No. JPH10-123450 published on May 15, 1998.

Poupyrev, et al., "Developing a Generic Augmented Reality Interface", In Proceedings of Computer, vol. 35 Issue 3, Mar. 2002, pp. 44-50.

Zhu, et al., "Personalized In-store E-Commerce with the PromoPad: An Augmented Reality Shopping Assistant", In Proceedings of Electronic Journal for E-commerce Tools and Applications, vol. 1 Issue 3, 2004, 19 pages.

Bajura, et al., "Merging Virtual Objects with the Real World: Seeing Ultrasound Imagery within the Patient", In Proceedings of 19th Annual Conference on Computer Graphics and Interactive Techniques, vol. 26 Issue 2, Jul. 1992, pp. 203-210.

Ajanki, et al., "Ubiquitous Contextual Information Access with Proactive Retrieval and Augmentation", In Proceedings of 4th International Workshop on Ubiquitous Virtual Reality, Mar. 8, 2010, 5 pages.

Katz, Leslie, "Tele Scouter Sends Translations Right to your Retina", Published on: Nov. 2, 2009, Available at: http://news.cnet.com/8301-17938_105-10388668-1.html?tag=mncol;txt.

Cowper, et al., "Improving Our View of the World: Police and Augmented Reality Technology", In Federal Bureau of Investigation, 2003, 68 pages.

Nilsson, et al., "Hands Free Interaction with Virtual Information in a Real Environment: Eye Gaze as an Interaction Tool in an Augmented Reality System", In Journal of PsychNology, vol. 7, Issue 2, 2009, pp. 175-196.

Van Krevelen, et al., "A Survey of Augmented Reality Technologies, Applications and Limitations", The International Journal of Virtual Reality, vol. 9, Issue 2, Jun. 2010, pp. 1-20.

Kato, et al., "Marker Tracking and HMD Calibration for a Video-based Augmented Reality Conferencing System", In Proceedings of the 2nd IEEE and ACM International Workshop on Augmented Reality, Oct. 20-21, 1999, pp. 85-94.

Peternier, et al., "Chloe@University: An indoors, HMD-based Mobile Mixed Reality Guide", Retrieved on: Nov. 14, 2011, Available at: http://infoscience.epfl.ch/record/116211/files/Chloe_VRST07_FINAL.pdf.

"EON Coliseum", Retrieved on: Nov. 14, 2011, Available at: http://www.eonexperience.com/Coliseum.aspx.

Reitmayr, et al., "Collaborative Augmented Reality for Outdoor Navigation and Information Browsing", In Proceedings of the Symposium on Location Based Services and TeleCartography, 2004, 11 pages.

Fuhrman, et al., "Concept and Implementation of a Collaborative Workspace for Augmented Reality", In Vienna University of Technology, vol. 18, Issue 3, 1999, 11 pages.

Office Action dated May 9, 2014, in U.S. Appl. No. 13/665,477, filed Oct. 31, 2012.

Amendment dated Sep. 9, 2014, in U.S. Appl. No. 13/665,477, filed Oct. 31, 2012.

Notice of Allowance dated Dec. 31, 2014, in U.S. Appl. No. 13/665,477, filed Oct. 31, 2012.

International Preliminary Report on Patentability dated Nov. 4, 2014, in International Patent Application No. PCT/US2013/039431 filed May 3, 2013.

U.S. Appl. No. 14/675,296, filed Mar. 31, 2015.

International Preliminary Report on Patentability dated May 6, 2015 in PCT Application No. PCT/US2013/067853.

Office Action dated Aug. 14, 2015 in U.S. Appl. No. 14/675,296.

(56) References Cited

OTHER PUBLICATIONS

Response to Office Action filed Nov. 16, 2015 in U.S. Appl. No. 14/675,296.
Final Office Action dated Feb. 22, 2016 in U.S. Appl. No. 14/675,296.
Response to Final Office Action filed May 10, 2016 in U.S. Appl. No. 14/675,296.

* cited by examiner

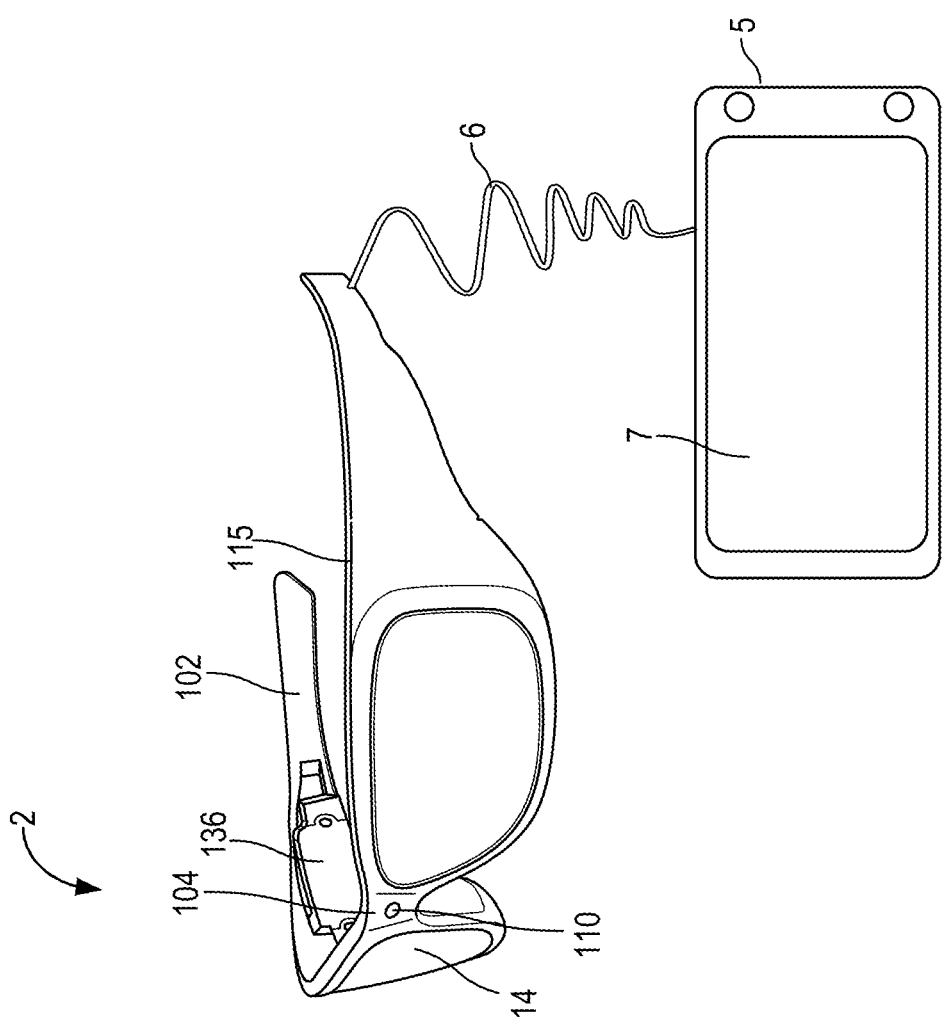

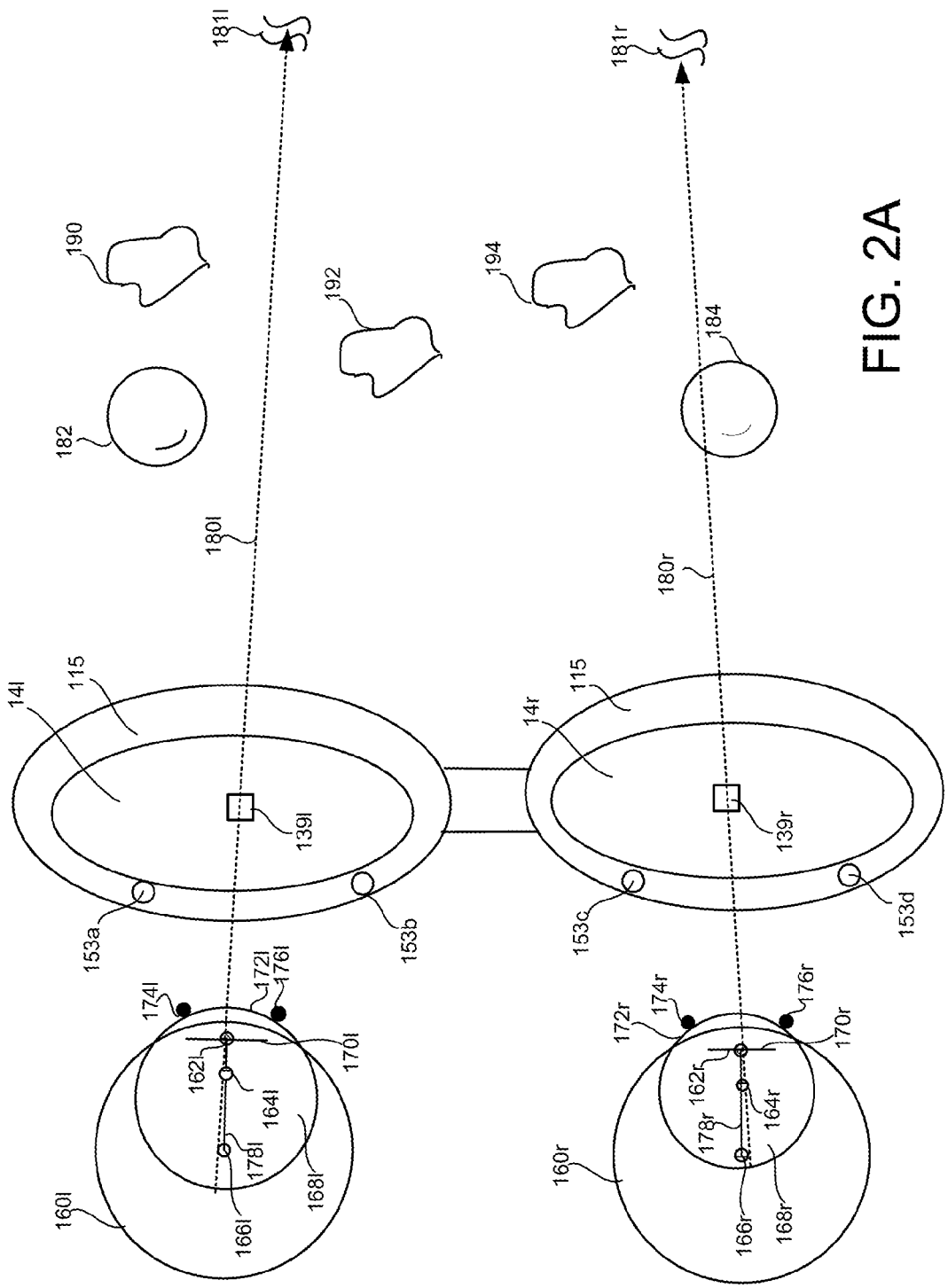

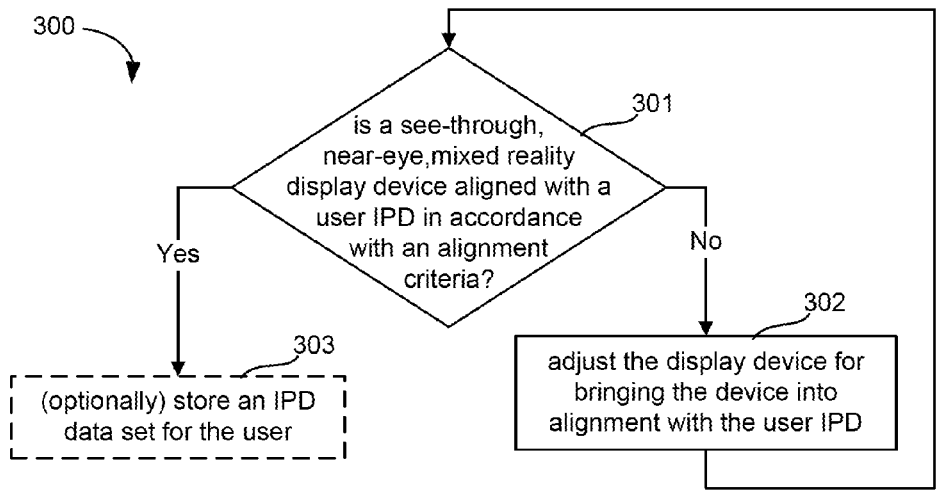
FIG. 3A
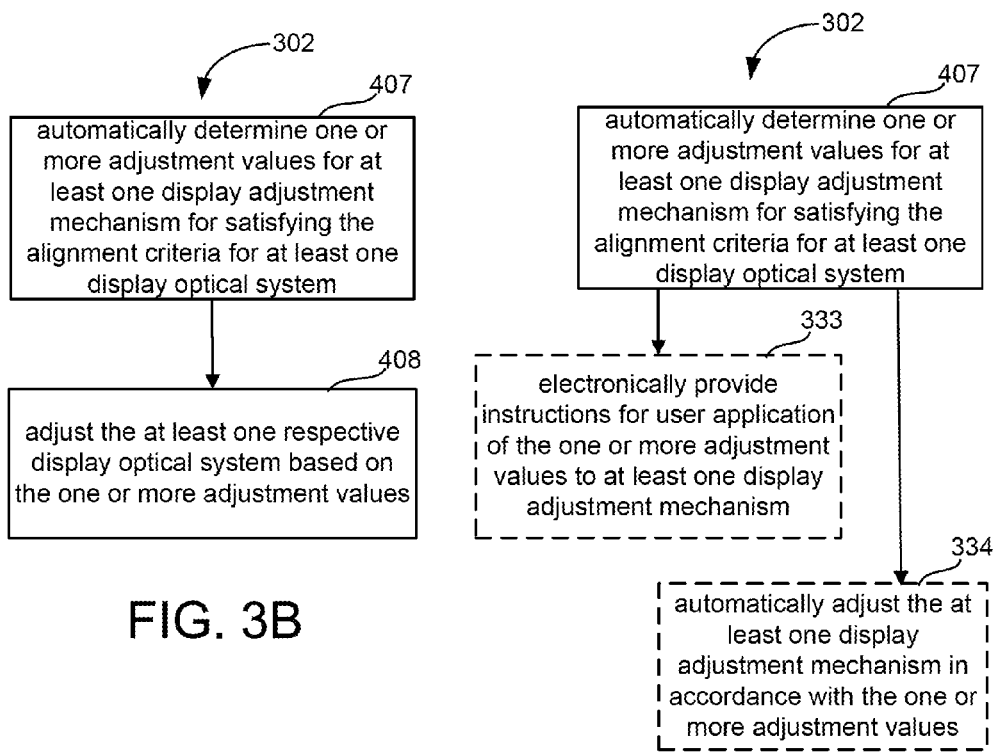
FIG. 3B
FIG. 3C

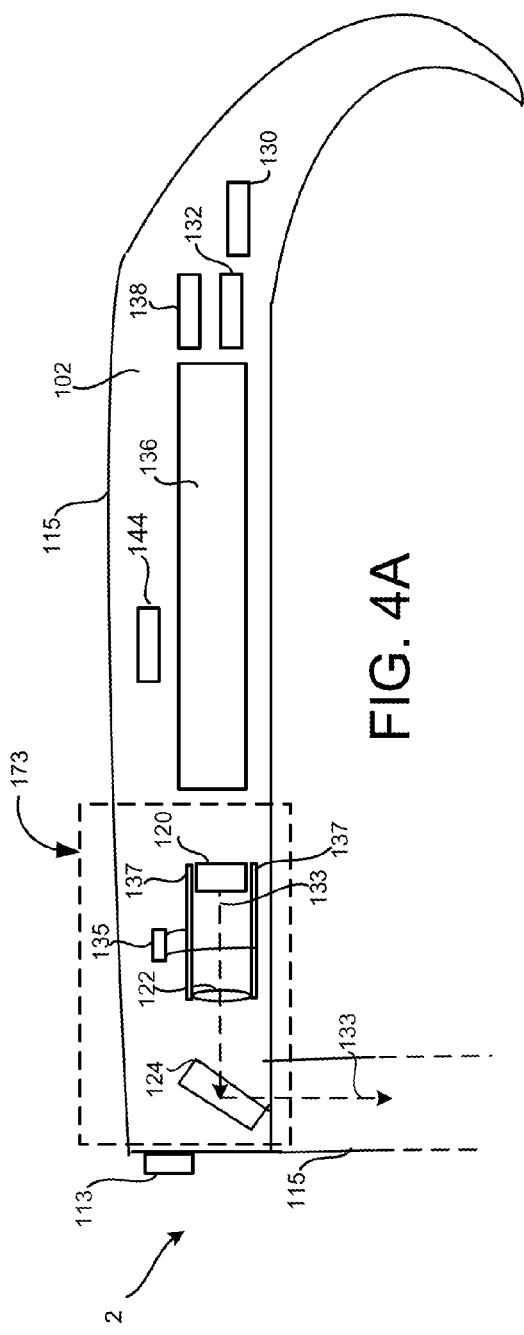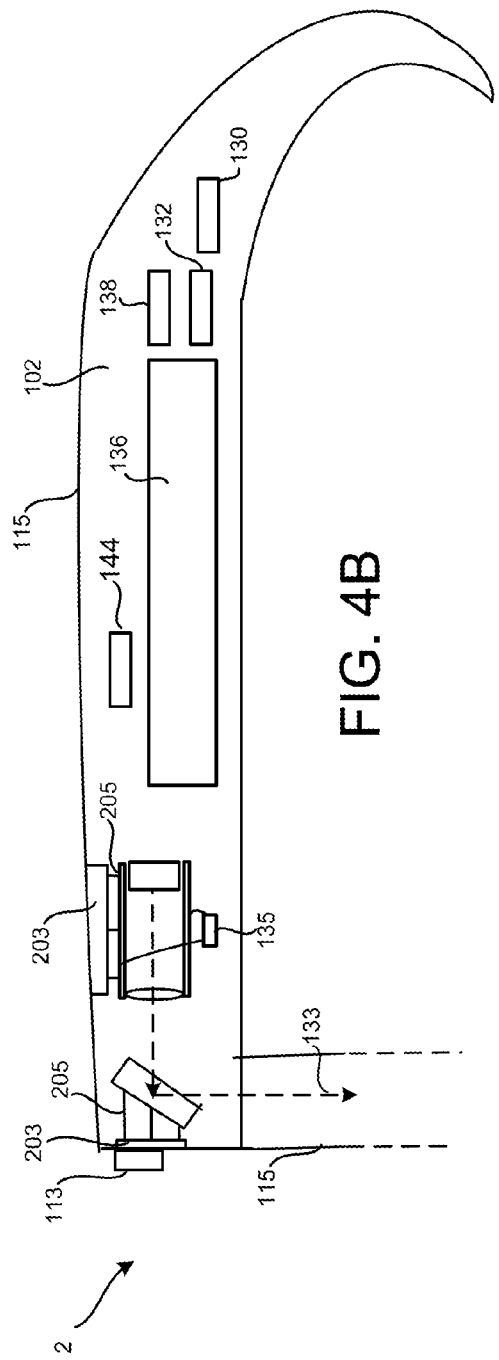

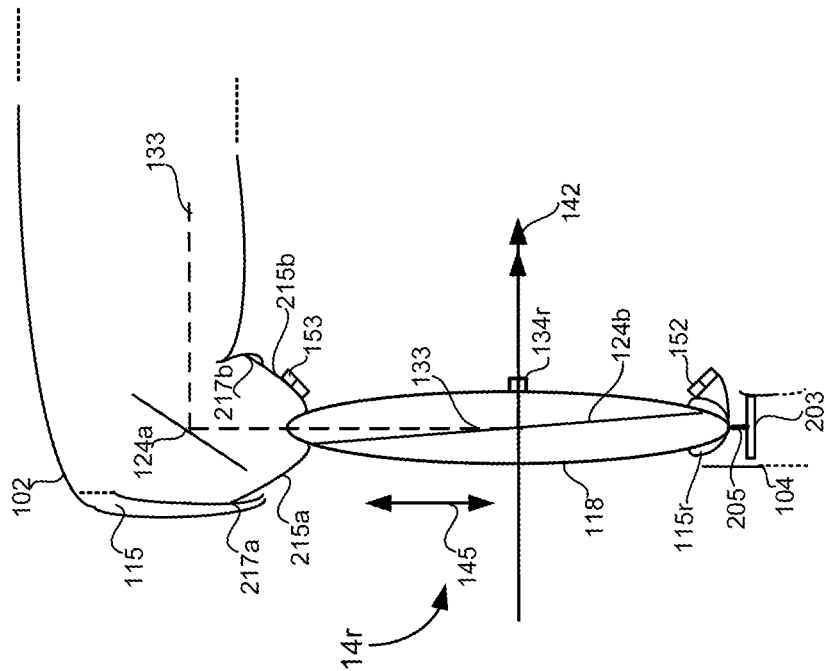
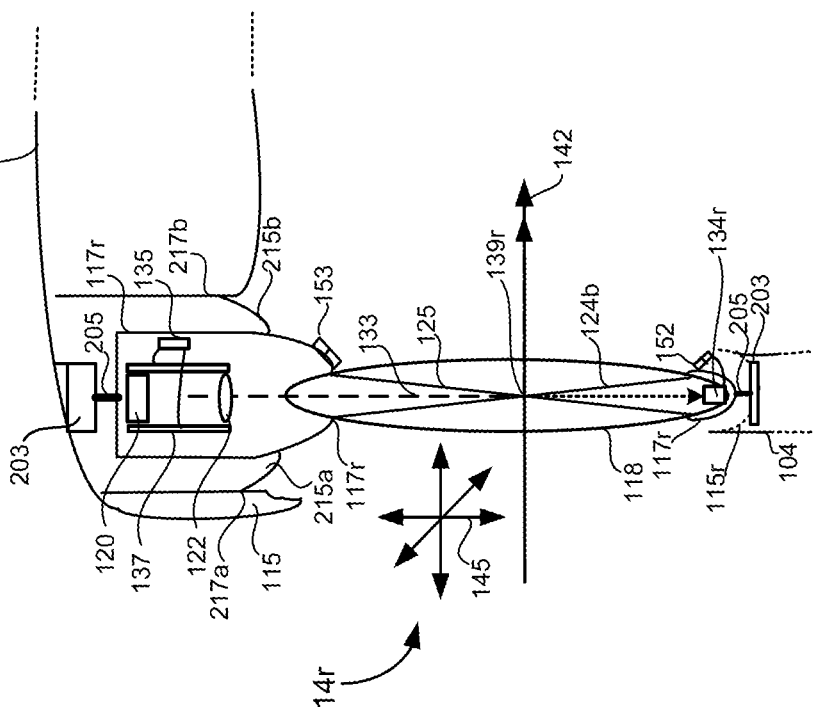

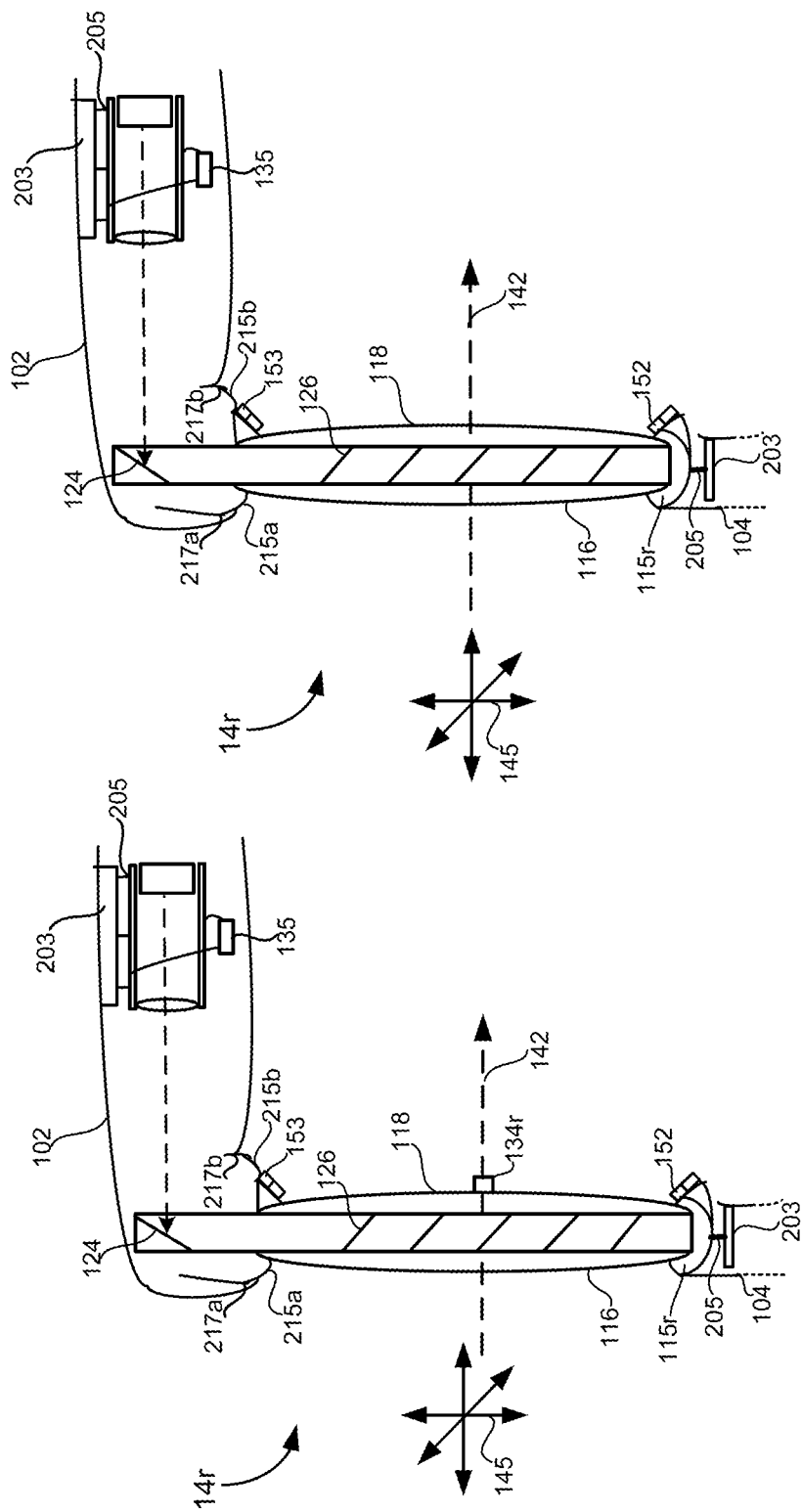

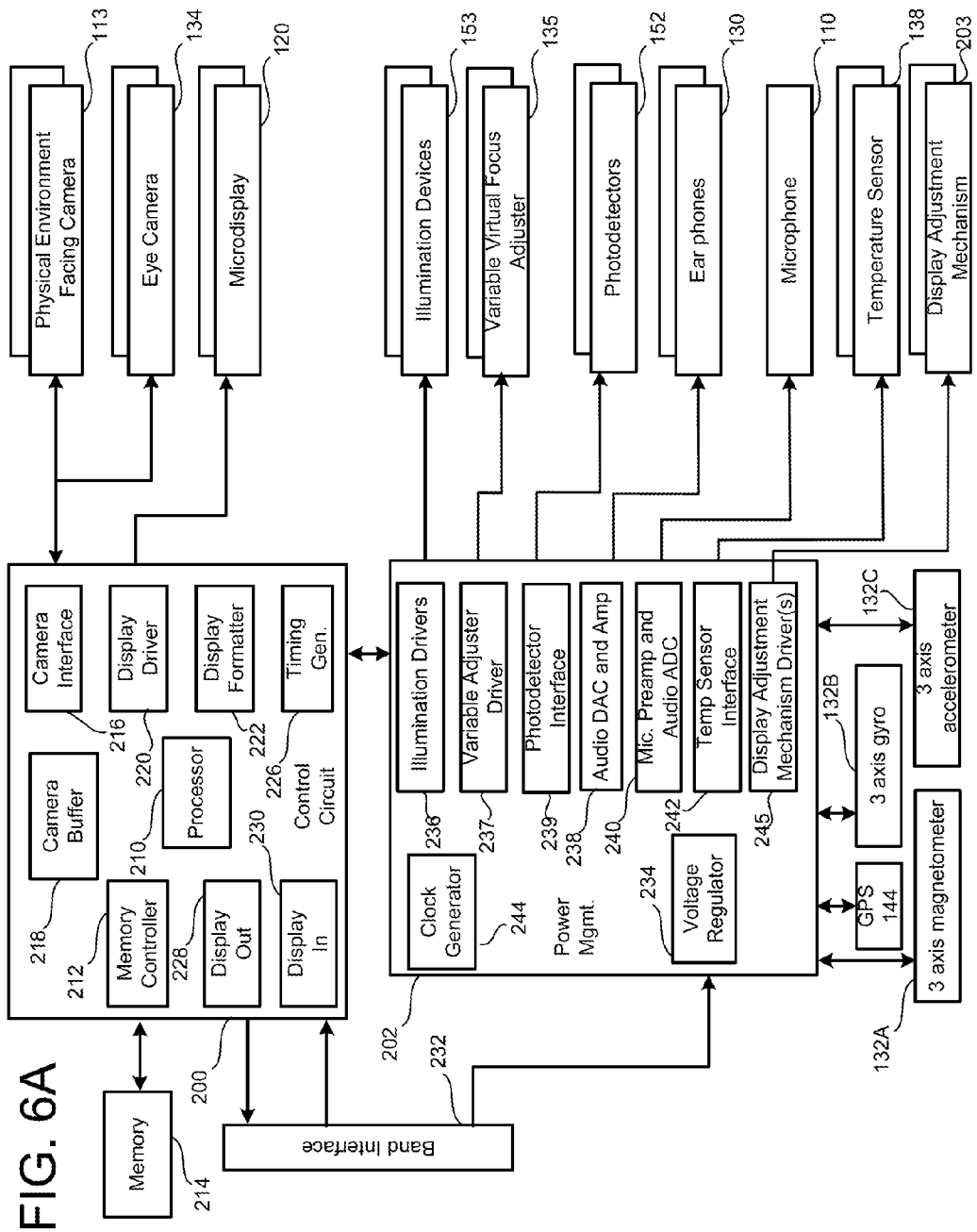

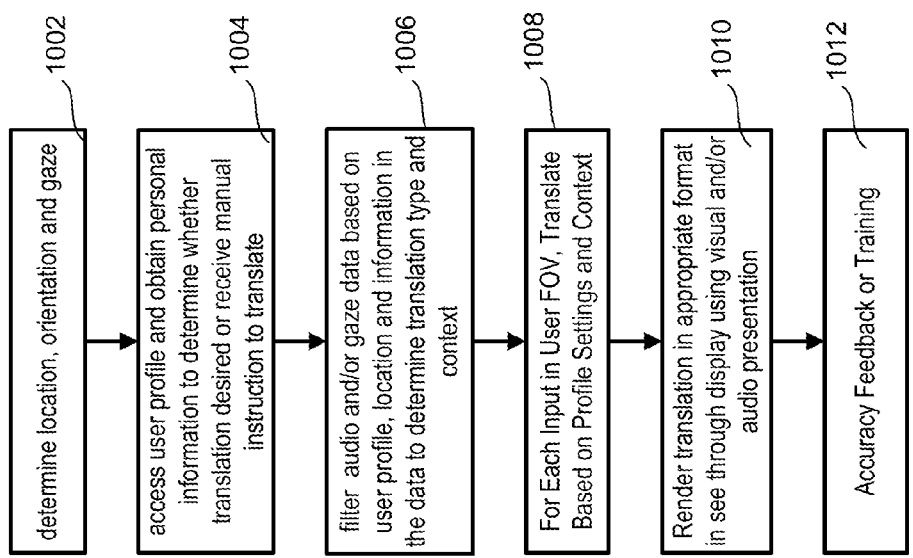
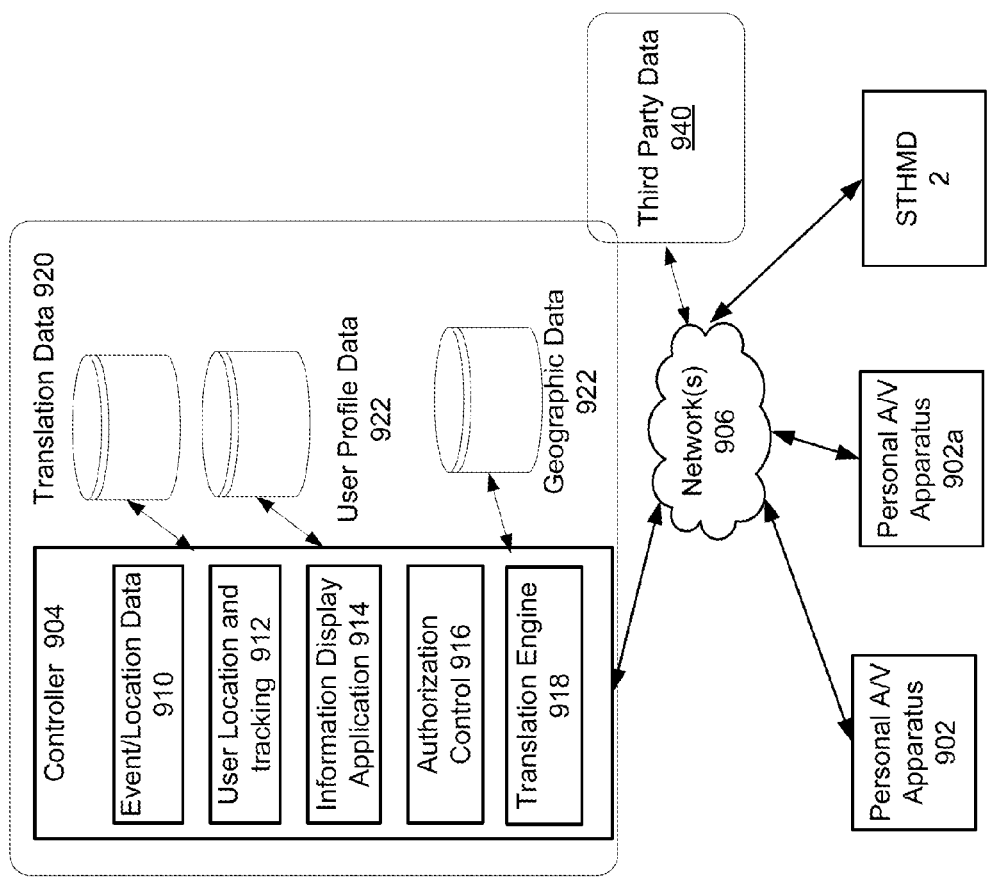

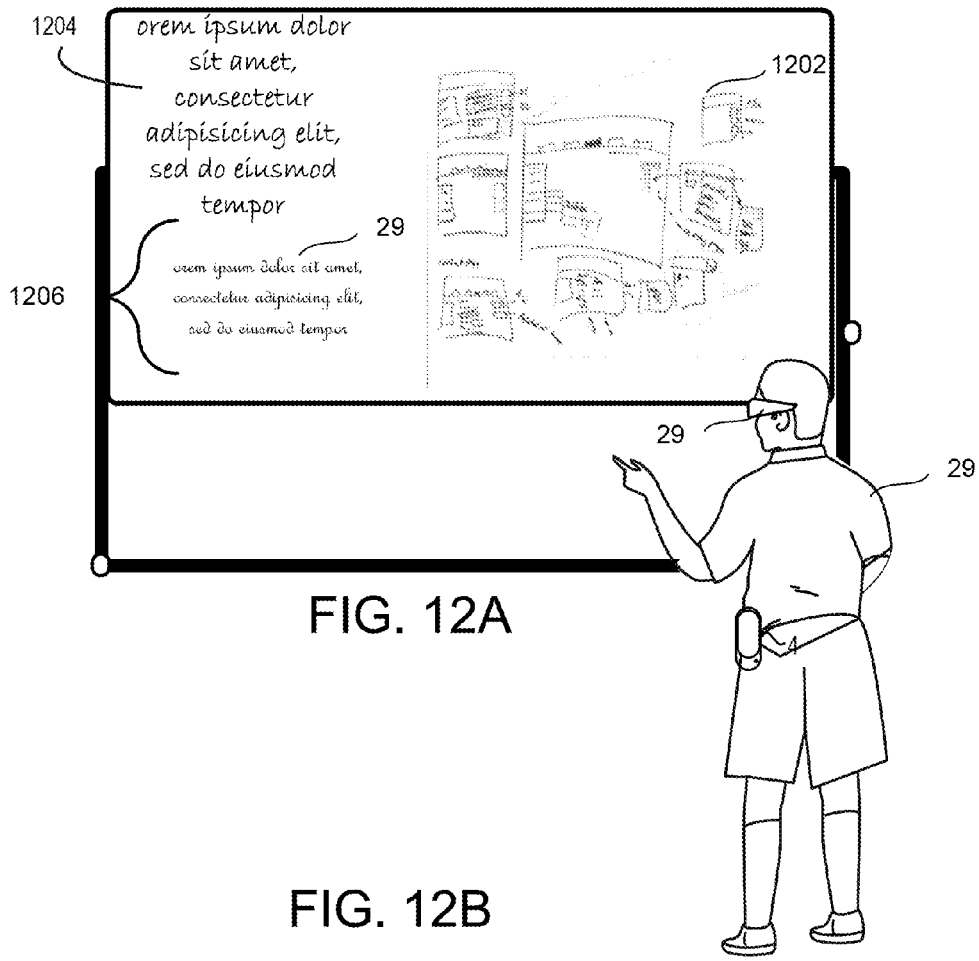
FIG. 12A
FIG. 12B
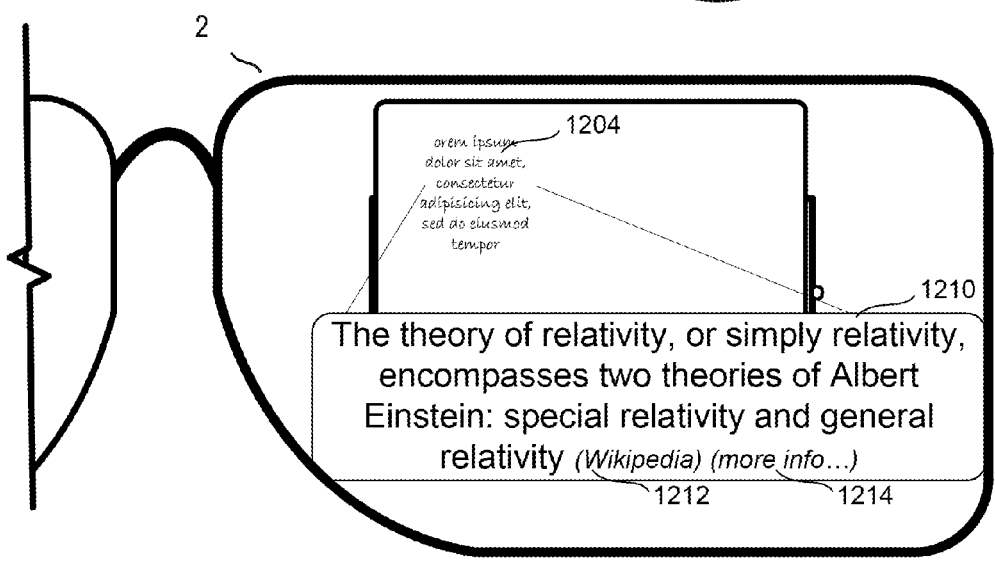

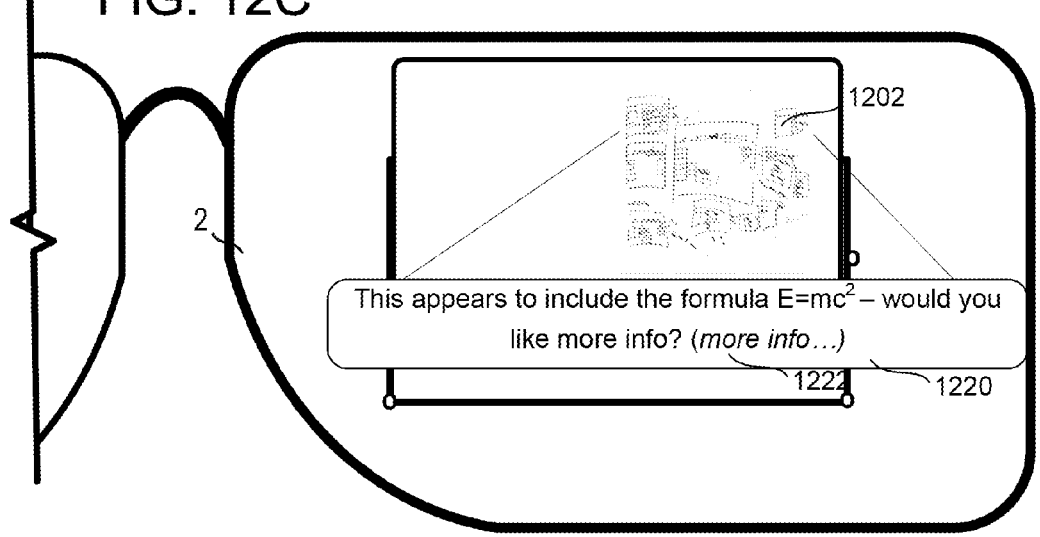
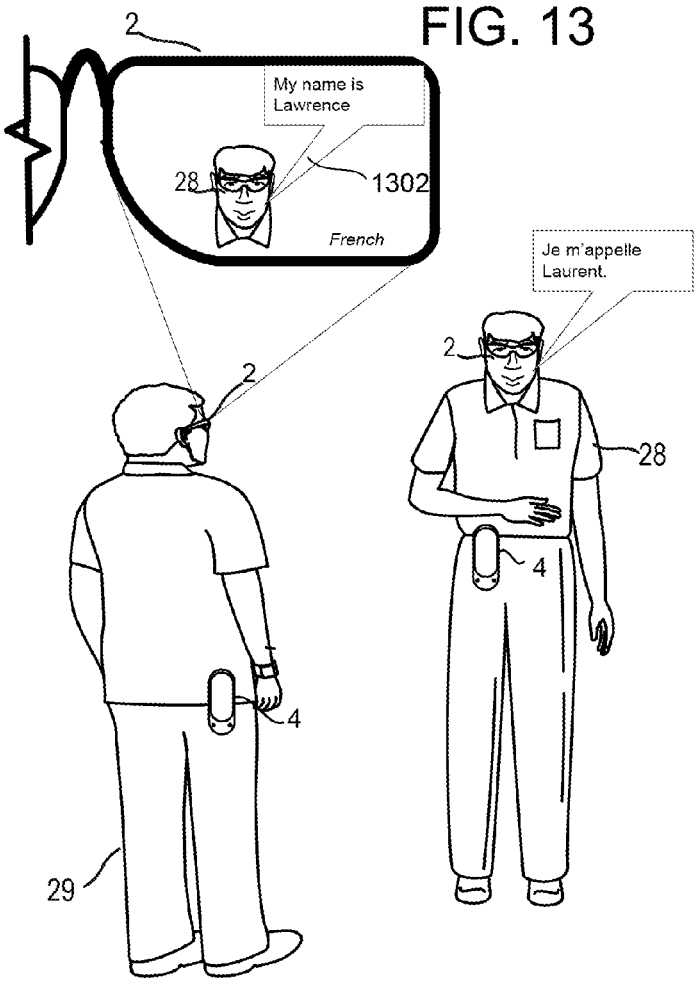

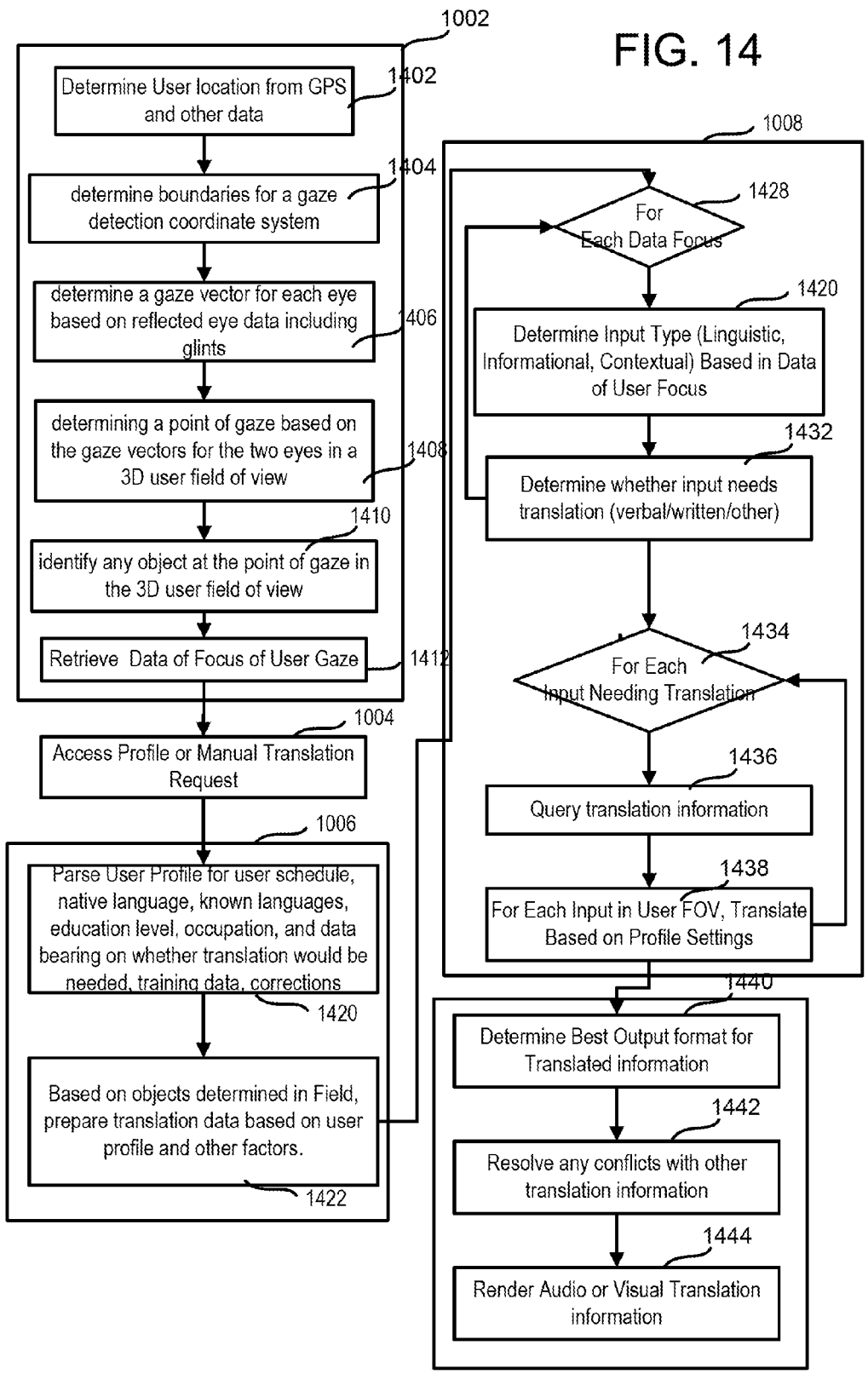

INTELLIGENT TRANSLATIONS IN PERSONAL SEE THROUGH DISPLAY

BACKGROUND

Augmented reality is a technology that allows virtual imagery to be mixed with a real world physical environment. For example, an augmented reality system can be used to insert virtual images before the eyes of a user. In many cases, augmented reality systems present a limited view of the real world with superimposed virtual images, but do not interpret items in the real world in presenting the virtual objects.

There are many existing types of automated translations, including Web-based language translation engines and mobile applications that translate text in data retrieved by a camera.

SUMMARY

Technology is described which provides various embodiments for implementing an augmented reality system that can provide linguistic, knowledge or context translations to a user. A see-through, near-eye, mixed reality display apparatus is used to provide translations of real world data for the wearer. A wearer's location and orientation with the apparatus is determined and input data for translation is selected using sensors of the apparatus. Input data can be audio or visual in nature, and selected by reference to the gaze of a wearer. Three-dimensional locations of objects within a field of view of the wearer at the location are determined and may provide input data for translation. The input data is translated for the user by retrieving user profile information bearing on accuracy of a translation and determining from the input data whether a linguistic translation, knowledge addition translation or context translation is useful. The linguistic translation, knowledge addition translation or context translation is provided to the user by rendering the translation in an audio or visual format in the see through head mounted display.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1B is a block diagram depicting example components of another embodiment of a see-through, mixed reality display device with adjustable IPD.

FIG. 2A is a top view illustrating examples of gaze vectors extending to a point of gaze at a distance and a direction for aligning a far IPD.

FIG. 3A is a flowchart of a method embodiment for aligning a see-through, near-eye, mixed reality display with an IPD.

FIG. 3B is a flowchart of an implementation example of a method for adjusting a display device for bringing the device into alignment with a user IPD.

FIG. 3C is a flowchart illustrating different example options of mechanical or automatic adjustment of at least one display adjustment mechanism.

FIG. 4A is a side view of an eyeglass temple in an eyeglasses embodiment of a mixed reality display device providing support for hardware and software components.

FIG. 4B is a side view of an eyeglass temple in an embodiment of a mixed reality display device providing support for hardware and software components and three dimensional adjustment of a microdisplay assembly.

FIG. 5A is a top view of an embodiment of a movable display optical system of a see-through, near-eye, mixed reality device including an arrangement of gaze detection elements.

FIG. 5B is a top view of another embodiment of a movable display optical system of a see-through, near-eye, mixed reality device including an arrangement of gaze detection elements.

FIG. 5C is a top view of a third embodiment of a movable display optical system of a see-through, near-eye, mixed reality device including an arrangement of gaze detection elements.

FIG. 5D is a top view of a fourth embodiment of a movable display optical system of a see-through, near-eye, mixed reality device including an arrangement of gaze detection elements.

FIG. 6A is a block diagram of one embodiment of hardware and software components of a see-through, near-eye, mixed reality display unit as may be used with one or more embodiments.

FIG. 9 is a block level diagram of a system embodiment suitable for implementing the present technology.

FIG. 10 is a flow chart representing an overall method in accordance with the present technology.

FIG. 12A is a depiction of a user in front of a whiteboard with multiple types of information drawn on the whiteboard.

FIG. 12B is a through-the-lens view of the user viewing the whiteboard in FIG. 12A.

FIG. 12C is an alternative through-the-lens view of the user of FIG. 12A.

FIG. 13 is a depiction of a user receiving an audible translation.

FIG. 14 is a flowchart illustrating one method for performing steps of FIG. 10 in additional detail.

DETAILED DESCRIPTION

The technology described herein includes a see-through, near-eye, mixed reality display device for providing customized experiences including translations of real world data for a user. A wearer's location and orientation with the apparatus is determined and input data for translation is selected using sensors of the apparatus. Input data can be audio or visual in nature, and selected by reference to the gaze of a wearer. Three-dimensional locations of objects within a field of view of the wearer at the location are determined and may provide input data for translation. The input data is translated for the user by retrieving user profile information bearing on accuracy of a translation and determining from the input data whether a linguistic translation, knowledge addition translation or context translation is useful. The linguistic translation, knowledge addition translation or context translation is provided to the user by rendering the translation in an audio or visual format in the see through head mounted display.

A context translation includes translation of expressions from users in a room based on shared verbal or written information. Emotional states and/or truthfulness of others can be derived from facial movements, expressions and user actions, and provide feedback to the wearer. User-specific information in a profile can be used for context and knowledge determinations to understand the level of information a user requires. The technology can be trained to recognize wearer handwriting and speech to increase accuracy. Multisensory information from the apparatus can be used for context translations of the emotions of other persons in the field of view of the wearer. Translation of complex information in the input data into more basic ideas, including the annotation of information with links, text or other information explaining difficult concepts to the user, is provided. Annotation types include audio information for visual objects, links to tutorial or advanced articles and other information available from third party sources. Annotations can be basic, such as an alternative word definition or a synonym. Annotations can also be more complex, such as a full background article on the subject being discussed.

It should be understood that linguistic translations may include transliterations. For example, translations may including converting Arabic or Russian text to Roman lettering so that a user can read the text in the language it was written, but with their own alphabet.

Figure 1A:
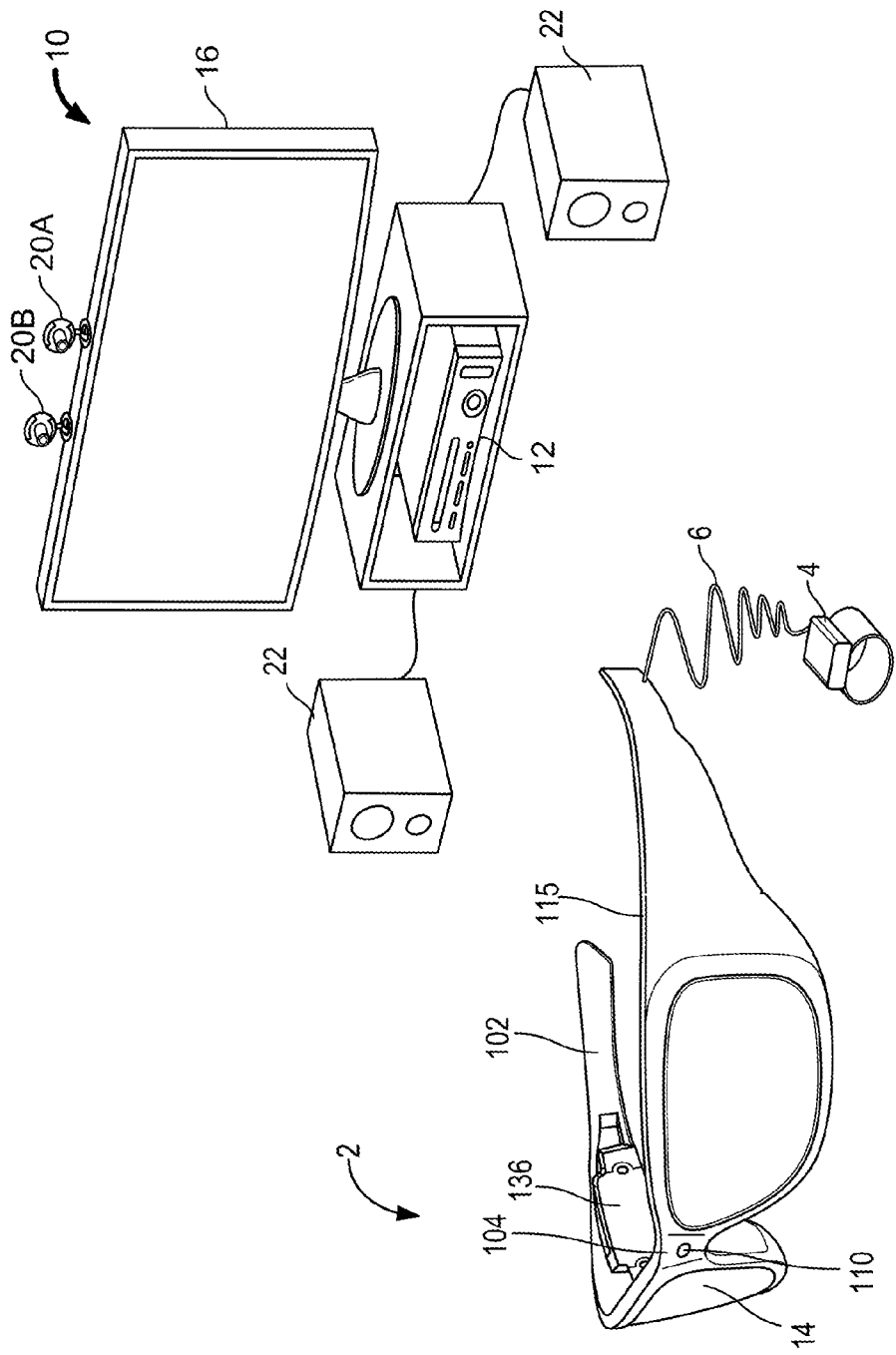
FIG. 1A is a block diagram depicting example components of one embodiment of a see-through, mixed reality display device with adjustable inter-pupillary distance (IPD) in a system environment in which the device may operate.

FIG. 1A is a block diagram depicting example components of one embodiment of a see-through, mixed reality display device in a system environment in which the device may operate. System 10 includes a see-through display device as a near-eye, head mounted display device 2 in communication with processing unit 4 via wire 6. In other embodiments, head mounted display device 2 communicates with processing unit 4 via wireless communication. Processing unit 4 may take various embodiments. In some embodiments, processing unit 4 is a separate unit which may be worn on the user's body, e.g. the wrist in the illustrated example or in a pocket, and includes much of the computing power used to operate near-eye display device 2. Processing unit 4 may communicate wirelessly (e.g., WiFi, Bluetooth, infra-red, or other wireless communication means) to one or more hub computing systems 12, hot spots, cellular data networks, etc. In other embodiments, the functionality of the processing unit 4 may be integrated in software and hardware components of the display device 2.

See through head mounted display device 2, which in one embodiment is in the shape of eyeglasses in a frame 115, is worn on the head of a user so that the user can see through a display, embodied in this example as a display optical system 14 for each eye, and thereby have an actual direct view of the space in front of the user. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Based on the context of executing software, for example, a gaming application, the system can project images of virtual objects, sometimes referred to as virtual images, on the display that are viewable by the person wearing the see-through display device while that person is also viewing real world objects through the display.

Frame 115 provides a support for holding elements of the system in place as well as a conduit for electrical connections. In this embodiment, frame 115 provides a convenient eyeglass frame as support for the elements of the system discussed further below. In other embodiments, other support structures can be used. An example of such a structure is a visor, hat, helmet or goggles. The frame 115 includes a temple or side arm for resting on each of a user's ears. Temple 102 is representative of an embodiment of the right temple and includes control circuitry 136 for the display device 2. Nose bridge 104 of the frame includes a microphone 110 for recording sounds and transmitting audio data to processing unit 4.

Hub computing system 12 may be a computer, a gaming system or console, or the like. According to an example embodiment, the hub computing system 12 may include hardware components and/or software components such that hub computing system 12 may be used to execute applications such as gaming applications, non-gaming applications, or the like. An application may be executing on hub computing system 12, the display device 2, as discussed below on a mobile device 5 or a combination of these.

In one embodiment, the hub computing system 12 further includes one or more capture devices, such as capture devices 20A and 20B. The two capture devices can be used to capture the room or other physical environment of the user but are not necessary for use with see through head mounted display device 2 in all embodiments.

Capture devices 20A and 20B may be, for example, cameras that visually monitor one or more users and the surrounding space such that gestures and/or movements performed by the one or more users, as well as the structure of the surrounding space, may be captured, analyzed, and tracked to perform one or more controls or actions within an application and/or animate an avatar or on-screen character.

Hub computing system 12 may be connected to an audiovisual device 16 such as a television, a monitor, a high-definition television (HDTV), or the like that may provide game or application visuals. In some instances, audiovisual device 16 may be a three-dimensional display device. In one example, audiovisual device 16 includes internal speakers. In other embodiments, audiovisual device 16, a separate stereo or hub computing system 12 is connected to external speakers 22.

Note that display device 2 and processing unit 4 can be used without Hub computing system 12, in which case processing unit 4 will communicate with a WiFi network, a cellular network or other communication means.

FIG. 1B is a block diagram depicting example components of another embodiment of a see-through, mixed reality display device. In this embodiment, the near-eye display device 2 communicates with a mobile computing device 5 as an example embodiment of the processing unit 4. In the illustrated example, the mobile device 5 communicates via wire 6, but communication may also be wireless in other examples.

Furthermore, as in the hub computing system 12, gaming and non-gaming applications may execute on a processor of the mobile device 5 which user actions control or which user actions animate an avatar as may be displayed on a display 7 of the device 5. The mobile device 5 also provides a network interface for communicating with other computing devices like hub computing system 12 over the Internet or via another communication network via a wired or wireless communication medium using a wired or wireless communication protocol. A remote network accessible computer system like hub computing system 12 may be leveraged for processing power and remote data access by a processing unit 4 like mobile device 5. Examples of hardware and software components of a mobile device 5 such as may be embodied in a smartphone or tablet computing device are described in FIG. 20, and these components can embody the hardware and software components of a processing unit 4 such as those discussed in the embodiment of FIG. 7A. Some other examples of mobile devices 5 are a laptop or notebook computer and a netbook computer.

In some embodiments, gaze detection of each of a user's eyes is based on a three dimensional coordinate system of gaze detection elements on a near-eye, mixed reality display device like the eyeglasses 2 in relation to one or more human eye elements such as a cornea center, a center of eyeball rotation and a pupil center. Examples of gaze detection elements which may be part of the coordinate system including glint generating illuminators and at least one sensor for capturing data representing the generated glints. As discussed below (see FIG. 16 discussion), a center of the cornea can be determined based on two glints using planar geometry. The center of the cornea links the pupil center and the center of rotation of the eyeball, which may be treated as a fixed location for determining an optical axis of the user's eye at a certain gaze or viewing angle.

FIG. 2A is a top view illustrating examples of gaze vectors extending to a point of gaze at a distance and direction for aligning a far inter-pupillary distance (IPD). FIG. 2A illustrates examples of gaze vectors intersecting at a point of gaze where a user's eyes are focused effectively at infinity, for example beyond five (5) feet, or, in other words, examples of gaze vectors when the user is looking straight ahead. In each Figure, a general reference number is denoted relative to specific left (l) and right (r) components thereof. A model of the eyeball 160 (160$l$, 160$r$) is illustrated for each eye based on the Gullstrand schematic eye model. For each eye, an eyeball 160 is modeled as a sphere with a center of rotation 166 (166$l$, 166$r$) and includes a cornea 168 modeled as a sphere too and having a center 164 (164$l$, 164$r$). The cornea rotates with the eyeball, and the center of rotation 166 of the eyeball may be treated as a fixed point. The cornea covers an iris 170 (170$l$, 170$r$) with a pupil 162 (162$l$, 162$r$) at its center. In this example, on the surface 172 (172$l$, 172$r$) of the respective cornea are glints 174 and 176.

In the illustrated embodiment of FIG. 2A, a sensor detection area 139 (139$l$ and 139$r$) is aligned with the optical axis of each display optical system 14 within an eyeglass frame 115. The sensor associated with the detection area is a camera in this example capable of capturing image data representing glints 174$l$ and 176$l$ generated respectively by illuminators 153$a$ and 153$b$ on the left side of the frame 115 and data representing glints 174$r$ and 176$r$ generated respectively by illuminators 153$c$ and 153$d$. Through the display optical systems, 14$l$ and 14$r$ in the eyeglass frame 115, the user's field of view includes both real objects 190, 192 and 194 and virtual objects 182, 184, and 186.

The axis 178 (178$l$, 178$r$) formed from the center of rotation 166 through the cornea center 164 to the pupil 162 is the optical axis of the eye. A gaze vector 180 is sometimes referred to as the line of sight or visual axis which extends from the fovea through the center of the pupil 162. The fovea is a small area of about 1.2 degrees located in the retina. The angular offset between the optical axis computed and the visual axis has horizontal and vertical components. The horizontal component is up to 5 degrees from the optical axis, and the vertical component is between 2 and 3 degrees. In many embodiments, the optical axis is determined and a small correction is determined through user calibration to obtain the visual axis which is selected as the gaze vector.

For each user, a virtual object may be displayed by the display device at each of a number of predetermined positions at different horizontal and vertical positions. An optical axis may be computed for each eye during display of the object at each position, and a ray modeled as extending from the position into the user eye. A gaze offset angle with horizontal and vertical components may be determined based on how the optical axis must be moved to align with the modeled ray. From the different positions, an average gaze offset angle with horizontal or vertical components can be selected as the small correction to be applied to each computed optical axis. In some embodiments, only a horizontal component is used for the gaze offset angle correction.

The visual axes 180$l$ and 180$r$ illustrate that the gaze vectors are not perfectly parallel as the vectors become closer together as they extend from the eyeball into the field of view at a point of gaze which is effectively at infinity as indicated by the symbols 181$l$ and 181$r$. At each display optical system 14, the gaze vector 180 appears to intersect the optical axis upon which the sensor detection area 139 is centered. In this configuration, the optical axes are aligned with the inter-pupillary distance (IPD). When a user is looking straight ahead, the IPD measured is also referred to as the far IPD.

When identifying an object for a user to focus on for aligning IPD at a distance, the object may be aligned in a direction along each optical axis of each display optical system. Initially, the alignment between the optical axis and user's pupil is not known. For a far IPD, the direction may be straight ahead through the optical axis. When aligning near IPD, the identified object may be in a direction through the optical axis, however due to vergence of the eyes necessary for close distances, the direction is not straight ahead although it may be centered between the optical axes of the display optical systems.

Figure 2B:
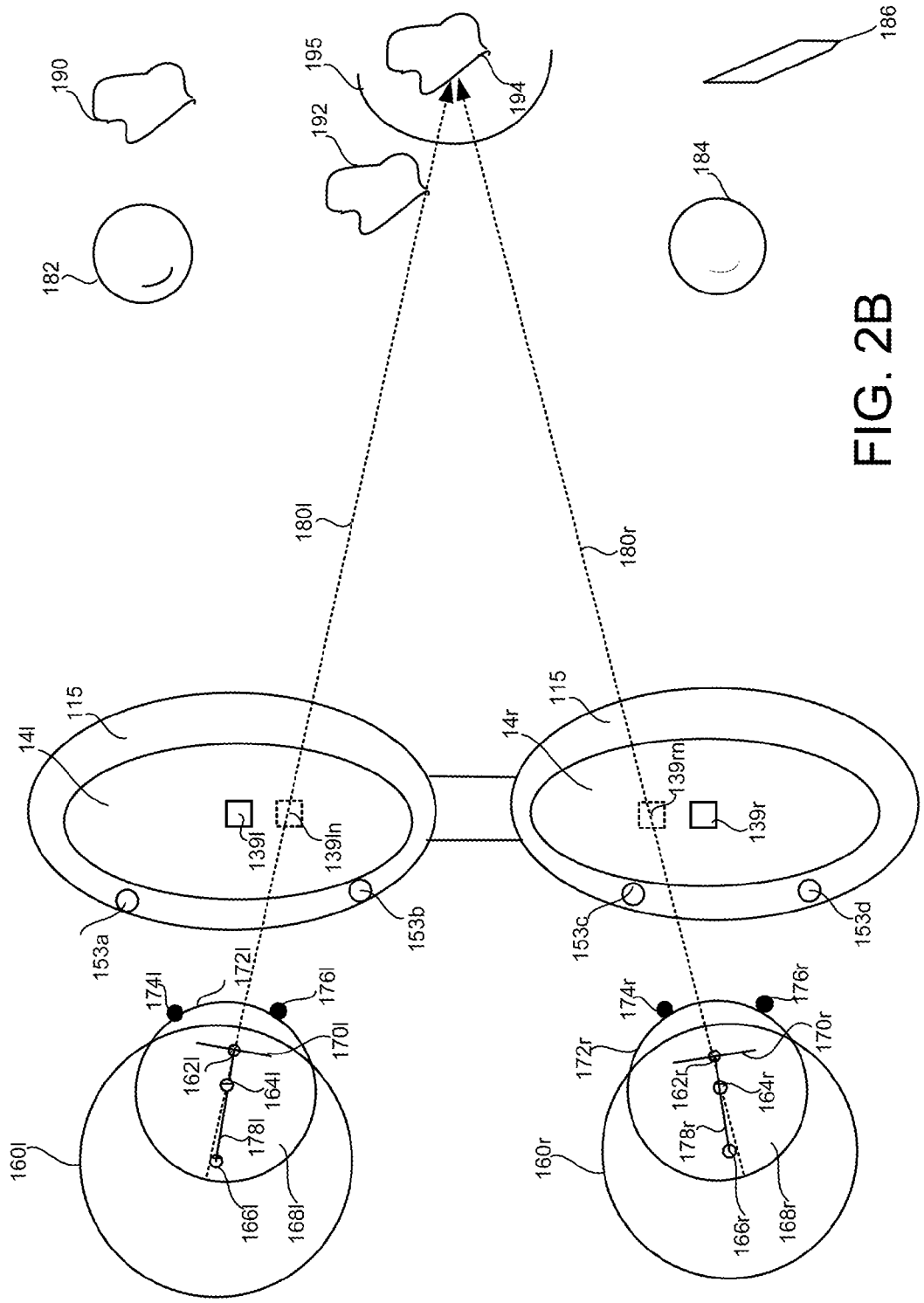
FIG. 2B is a top view illustrating examples of gaze vectors extending to a point of gaze at a distance and a direction for aligning a near IPD.

FIG. 2B is a top view illustrating examples of gaze vectors extending to a point of gaze at a distance and a direction for aligning a near IPD. In this example, the cornea 168$l$ of the left eye is rotated to the right or towards the user's nose, and the cornea 168r of the right eye is rotated to the left or towards the user's nose. Both pupils are gazing at a real object 194 at a much closer distance, for example two (2) feet in front of the user. Gaze vectors 180l and 180r from each eye enter the Panum's fusional region 195 in which real object 194 is located. The Panum's fusional region is the area of single vision in a binocular viewing system like that of human vision. The intersection of the gaze vectors 180l and 180r indicates that the user is looking at real object 194. At such a distance, as the eyeballs rotate inward, the distance between their pupils decreases to a near IPD. The near IPD is typically about 4 mm less than the far IPD. A near IPD distance criteria, e.g. a point of gaze at less than four feet for example, may be used to switch or adjust the IPD alignment of the display optical systems 14 to that of the near IPD. For the near IPD, each display optical system 14 may be moved toward the user's nose so the optical axis, and detection area 139, moves toward the nose a few millimeters as represented by detection areas 139ln and 139rn.

Techniques for automatically determining a user's IPD and automatically adjusting the STHMD to set the IPD for optimal user viewing, are discussed in co-pending U.S. patent application Ser. No. 13/221,739 entitled Gaze Detection In A See-Through, Near-Eye, Mixed Reality Display; U.S. patent application Ser. No. 13/221,707 entitled Adjustment Of A Mixed Reality Display For Inter-Pupillary Distance Alignment; and U.S. patent application Ser. No. 13/221,662 entitled Aligning Inter-Pupillary Distance In A Near-Eye Display System, all of which are hereby incorporated specifically by reference.

In general, FIG. 3A shows is a flowchart of a method embodiment 300 for aligning a see-through, near-eye, mixed reality display with an IPD. In step 301, one or more processors of the control circuitry 136, e.g. processor 210 in FIG. 7A below, the processing unit 4, 5, the hub computing system 12 or a combination of these automatically determines whether a see-through, near-eye, mixed reality display device is aligned with an IPD of a user in accordance with an alignment criteria. If not, in step 302, the one or more processors cause adjustment of the display device by at least one display adjustment mechanism for bringing the device into alignment with the user IPD. If it is determined the see-through, near-eye, mixed reality display device is in alignment with a user IPD, optionally, in step 303 an IPD data set is stored for the user. In some embodiments, a display device 2 may automatically determine whether there is IPD alignment every time anyone puts on the display device 2. However, as IPD data is generally fixed for adults, due to the confines of the human skull, an IPD data set may be determined typically once and stored for each user. The stored IPD data set may at least be used as an initial setting for a display device with which to begin an IPD alignment check.

FIG. 3B is a flowchart of an implementation example of a method for adjusting a display device for bringing the device into alignment with a user IPD. In this method, at least one display adjustment mechanism adjusts the position of a at least one display optical system 14 which is misaligned. In step 407, one or more adjustment are automatically determined for the at least one display adjustment mechanism for satisfying the alignment criteria for at least one display optical system. In step 408, that at least one display optical system is adjusted based on the one or more adjustment values. The adjustment may be performed automatically under the control of a processor or mechanically as discussed further below.

FIG. 3C is a flowchart illustrating different example options of mechanical or automatic adjustment by the at least one display adjustment mechanism as may be used to implement step 408. Depending on the configuration of the display adjustment mechanism in the display device 2, from step 407 in which the one or more adjustment values were already determined, the display adjustment mechanism may either automatically, meaning under the control of a processor, adjust the at least one display adjustment mechanism in accordance with the one or more adjustment values in step 334. Alternatively, one or more processors associated with the system, e.g. a processor in processing unit 4,5, processor 210 in the control circuitry 136, or even a processor of hub computing system 12 may electronically provide instructions as per step 333 for user application of the one or more adjustment values to the at least one display adjustment mechanism. There may be instances of a combination of automatic and mechanical adjustment under instructions.

Some examples of electronically provided instructions are instructions displayed by the microdisplay 120, the mobile device 5 or on a display 16 by the hub computing system 12 or audio instructions through speakers 130 of the display device 2. There may be device configurations with an automatic adjustment and a mechanical mechanism depending on user preference or for allowing a user some additional control.

FIG. 4A illustrates an exemplary arrangement of a see through, near-eye, mixed reality display device embodied as eyeglasses with movable display optical systems including gaze detection elements. What appears as a lens for each eye represents a display optical system 14 for each eye, e.g. 14r and 14l. A display optical system includes a see-through lens, e.g. 118 and 116 in FIGS. 5A-5b, as in an ordinary pair of glasses, but also contains optical elements (e.g. mirrors, filters) for seamlessly fusing virtual content with the actual direct real world view seen through the lenses 118, 116. A display optical system 14 has an optical axis which is generally in the center of the see-through lens 118, 116 in which light is generally collimated to provide a distortionless view. For example, when an eye care professional fits an ordinary pair of eyeglasses to a user's face, a goal is that the glasses sit on the user's nose at a position where each pupil is aligned with the center or optical axis of the respective lens resulting in generally collimated light reaching the user's eye for a clear or distortionless view.

In an exemplary device 2, a detection area of at least one sensor is aligned with the optical axis of its respective display optical system so that the center of the detection area is capturing light along the optical axis. If the display optical system is aligned with the user's pupil, each detection area of the respective sensor is aligned with the user's pupil. Reflected light of the detection area is transferred via one or more optical elements to the actual image sensor of the camera in this example illustrated by dashed line as being inside the frame 115.

In one example, a visible light camera (also commonly referred to as an RGB camera) may be the sensor. An example of an optical element or light directing element is a visible light reflecting mirror which is partially transmissive and partially reflective. The visible light camera provides image data of the pupil of the user's eye, while IR photodetectors 152 capture glints which are reflections in the IR portion of the spectrum. If a visible light camera is used, reflections of virtual images may appear in the eye data captured by the camera. An image filtering technique may be used to remove the virtual image reflections if desired. An IR camera is not sensitive to the virtual image reflections on the eye.

In other examples, the at least one sensor is an IR camera or a position sensitive detector (PSD) to which the IR radiation may be directed. For example, a hot reflecting surface may transmit visible light but reflect IR radiation. The IR radiation reflected from the eye may be from incident radiation of illuminators, other IR illuminators (not shown) or from ambient IR radiation reflected off the eye. In some examples, sensor may be a combination of an RGB and an IR camera, and the light directing elements may include a visible light reflecting or diverting element and an IR radiation reflecting or diverting element. In some examples, a camera may be small, e.g. 2 millimeters (mm) by 2 mm.

Various types of gaze detection systems are suitable for use in the present system. In some embodiments which calculate a cornea center as part of determining a gaze vector, two glints, and therefore two illuminators will suffice. However, other embodiments may use additional glints in determining a pupil position and hence a gaze vector. As eye data representing the glints is repeatedly captured, for example at 30 frames a second or greater, data for one glint may be blocked by an eyelid or even an eyelash, but data may be gathered by a glint generated by another illuminator.

FIG. 4A is a side view of an eyeglass temple 102 of the frame 115 in an eyeglasses embodiment of a see-through, mixed reality display device. At the front of frame 115 is physical environment facing video camera 113 that can capture video and still images. Particularly in some embodiments, physical environment facing camera 113 may be a depth camera as well as a visible light or RGB camera. For example, the depth camera may include an IR illuminator transmitter and a hot reflecting surface like a hot mirror in front of the visible image sensor which lets the visible light pass and directs reflected IR radiation within a wavelength range or about a predetermined wavelength transmitted by the illuminator to a CCD or other type of depth sensor. Other types of visible light camera (RGB camera) and depth cameras can be used. More information about depth cameras can be found in U.S. patent application Ser. No. 12/813,675, filed on Jun. 11, 2010, incorporated herein by reference in its entirety. The data from the sensors may be sent to a processor 210 of the control circuitry 136, or the processing unit 4, 5 or both which may process them but which the unit 4,5 may also send to a computer system over a network or hub computing system 12 for processing. The processing identifies objects through image segmentation and edge detection techniques and maps depth to the objects in the user's real world field of view. Additionally, the physical environment facing camera 113 may also include a light meter for measuring ambient light.

Control circuits 136 provide various electronics that support the other components of head mounted display device 2. More details of control circuits 136 are provided below with respect to FIGS. 6A and 6B. Inside, or mounted to temple 102, are ear phones 130, inertial sensors 132, GPS transceiver 144 and temperature sensor 138. In one embodiment inertial sensors 132 include a three axis magnetometer 132A, three axis gyro 132B and three axis accelerometer 132C (See FIG. 7A). The inertial sensors are for sensing position, orientation, and sudden accelerations of head mounted display device 2. From these movements, head position may also be determined.

The display device 2 provides an image generation unit which can create one or more images including one or more virtual objects. In some embodiments a microdisplay may be used as the image generation unit. A microdisplay assembly 173 in this example comprises light processing elements and a variable focus adjuster 135. An example of a light processing element is a microdisplay unit 120. Other examples include one or more optical elements such as one or more lenses of a lens system 122 and one or more reflecting elements such as surfaces 124a and 124b in FIGS. 6A and 6B or 124 in FIGS. 6C and 6D. Lens system 122 may comprise a single lens or a plurality of lenses.

Mounted to or inside temple 102, the microdisplay unit 120 includes an image source and generates an image of a virtual object. The microdisplay unit 120 is optically aligned with the lens system 122 and the reflecting surface 124 or reflecting surfaces 124a and 124b as illustrated in the following Figures. The optical alignment may be along an optical axis 133 or an optical path 133 including one or more optical axes. The microdisplay unit 120 projects the image of the virtual object through lens system 122, which may direct the image light, onto reflecting element 124 which directs the light into lightguide optical element 112 as in FIGS. 5C and 5D or onto reflecting surface 124a (e.g. a mirror or other surface) which directs the light of the virtual image to a partially reflecting element 124b which combines the virtual image view along path 133 with the natural or actual direct view along the optical axis 142 as in FIGS. 5A-5D. The combination of views are directed into a user's eye.

The variable focus adjuster 135 changes the displacement between one or more light processing elements in the optical path of the microdisplay assembly or an optical power of an element in the microdisplay assembly. The optical power of a lens is defined as the reciprocal of its focal length, e.g. 1/focal length, so a change in one effects the other. The change in focal length results in a change in the region of the field of view, e.g. a region at a certain distance, which is in focus for an image generated by the microdisplay assembly 173.

In one example of the microdisplay assembly 173 making displacement changes, the displacement changes are guided within an armature 137 supporting at least one light processing element such as the lens system 122 and the microdisplay 120 in this example. The armature 137 helps stabilize the alignment along the optical path 133 during physical movement of the elements to achieve a selected displacement or optical power. In some examples, the adjuster 135 may move one or more optical elements such as a lens in lens system 122 within the armature 137. In other examples, the armature may have grooves or space in the area around a light processing element so it slides over the element, for example, microdisplay 120, without moving the light processing element. Another element in the armature such as the lens system 122 is attached so that the system 122 or a lens within slides or moves with the moving armature 137. The displacement range is typically on the order of a few millimeters (mm). In one example, the range is 1-2 mm. In other examples, the armature 137 may provide support to the lens system 122 for focal adjustment techniques involving adjustment of other physical parameters than displacement. An example of such a parameter is polarization.

For more information on adjusting a focal distance of a microdisplay assembly, see U.S. patent Ser. No. 12/941,825 entitled "Automatic Variable Virtual Focus for Augmented Reality Displays," filed Nov. 8, 2010, having inventors Avi Bar-Zeev and John Lewis and which is hereby incorporated by reference.

In one example, the adjuster 135 may be an actuator such as a piezoelectric motor. Other technologies for the actuator may also be used and some examples of such technologies are a voice coil formed of a coil and a permanent magnet, a magnetostriction element, and an electrostriction element.

There are different image generation technologies that can be used to implement microdisplay 120. For example, microdisplay 120 can be implemented using a transmissive projection technology where the light source is modulated by optically active material, backlit with white light. These technologies are usually implemented using LCD type displays with powerful backlights and high optical energy densities. Microdisplay 120 can also be implemented using a reflective technology for which external light is reflected and modulated by an optically active material. The illumination is forward lit by either a white source or RGB source, depending on the technology. Digital light processing (DLP), liquid crystal on silicon (LCOS) and MIRASOL® display technology from Qualcomm, Inc. are all examples of reflective technologies which are efficient as most energy is reflected away from the modulated structure and may be used in the system described herein. Additionally, microdisplay 120 can be implemented using an emissive technology where light is generated by the display. For example, a PICOP™ engine from Microvision, Inc. emits a laser signal with a micro mirror steering either onto a tiny screen that acts as a transmissive element or beamed directly into the eye (e.g., laser).

FIG. 4B is a side view of an eyeglass temple in another embodiment of a mixed reality display device providing support for hardware and software components and three dimensional adjustment of a microdisplay assembly. Some of the numerals illustrated in the FIG. 5A above have been removed to avoid clutter in the drawing. In embodiments where the display optical system 14 is moved in any of three dimensions, the optical elements represented by reflecting surface 124 and the other elements of the microdisplay assembly 173, e.g. 120, 122 may also be moved for maintaining the optical path 133 of the light of a virtual image to the display optical system. An XYZ transport mechanism in this example made up of one or more motors represented by motor block 203 and shafts 205 under control of the processor 210 of control circuitry 136 (see FIG. 6A) control movement of the elements of the microdisplay assembly 173. An example of motors which may be used are piezoelectric motors. In the illustrated example, one motor is attached to the armature 137 and moves the variable focus adjuster 135 as well, and another representative motor 203 controls the movement of the reflecting element 124.

FIG. 5A is a top view of an embodiment of a movable display optical system 14 of a see-through, near-eye, mixed reality device 2 including an arrangement of gaze detection elements. A portion of the frame 115 of the near-eye display device 2 will surround a display optical system 14 and provides support for elements of an embodiment of a microdisplay assembly 173 including microdisplay 120 and its accompanying elements as illustrated. In order to show the components of the display system 14, in this case 14r for the right eye system, a top portion of the frame 115 surrounding the display optical system is not depicted. Additionally, the microphone 110 in bridge 104 is not shown in this view to focus attention on the operation of the display adjustment mechanism 203. As in the example of FIG. 4C, the display optical system 14 in this embodiment is moved by moving an inner frame 117r, which in this example surrounds the microdisplay assembly 173 as well. The display adjustment mechanism is embodied in this embodiment as three axis motors 203 which attach their shafts 205 to inner frame 117r to translate the display optical system 14, which in this embodiment includes the microdisplay assembly 173, in any of three dimensions as denoted by symbol 144 indicating three (3) axes of movement.

The display optical system 14 in this embodiment has an optical axis 142 and includes a see-through lens 118 allowing the user an actual direct view of the real world. In this example, the see-through lens 118 is a standard lens used in eye glasses and can be made to any prescription (including no prescription). In another embodiment, see-through lens 118 can be replaced by a variable prescription lens. In some embodiments, see-through, near-eye display device 2 will include additional lenses.

The display optical system 14 further comprises reflecting surfaces 124a and 124b. In this embodiment, light from the microdisplay 120 is directed along optical path 133 via a reflecting element 124a to a partially reflective element 124b embedded in lens 118 which combines the virtual object image view traveling along optical path 133 with the natural or actual direct view along the optical axis 142 so that the combined views are directed into a user's eye, right one in this example, at the optical axis, the position with the most collimated light for a clearest view.

A detection area of a light sensor is also part of the display optical system 14r. An optical element 125 embodies the detection area by capturing reflected light from the user's eye received along the optical axis 142 and directs the captured light to the sensor 134r, in this example positioned in the lens 118 within the inner frame 117r. As shown, the arrangement allows the detection area 139 of the sensor 134r to have its center aligned with the center of the display optical system 14. For example, if sensor 134r is an image sensor, sensor 134r captures the detection area 139, so an image captured at the image sensor is centered on the optical axis because the detection area 139 is. In one example, sensor 134r is a visible light camera or a combination of RGB/IR camera, and the optical element 125 includes an optical element which reflects visible light reflected from the user's eye, for example a partially reflective mirror.

In other embodiments, the sensor 134r is an IR sensitive device such as an IR camera, and the element 125 includes a hot reflecting surface which lets visible light pass through it and reflects IR radiation to the sensor 134r. An IR camera may capture not only glints, but also an infra-red or near infra-red image of the user's eye including the pupil.

In other embodiments, the IR sensor device 134r is a position sensitive device (PSD), sometimes referred to as an optical position sensor. The depiction of the light directing elements, in this case reflecting elements, 125, 124, 124a and 124b in FIGS. 5A-5D are representative of their functions. The elements may take any number of forms and be implemented with one or more optical components in one or more arrangements for directing light to its intended destination such as a camera sensor or a user's eye.

As discussed in FIGS. 2A and 2B above and in the Figures below, when the user is looking straight ahead, and the center of the user's pupil is centered in an image captured of the user's eye when a detection area 139 or an image sensor 134r is effectively centered on the optical axis of the display, the display optical system 14r is aligned with the pupil. When both display optical systems 14 are aligned with their respective pupils, the distance between the optical centers matches or is aligned with the user's inter-pupillary distance. In the example of FIG. 6A, the inter-pupillary distance can be aligned with the display optical systems 14 in three dimensions.

In one embodiment, if the data captured by the sensor 134 indicates the pupil is not aligned with the optical axis, one or more processors in the processing unit 4, 5 or the control circuitry 136 or both use a mapping criteria which correlates a distance or length measurement unit to a pixel or other discrete unit or area of the image for determining how far off the center of the pupil is from the optical axis 142. Based on the distance determined, the one or more processors determine adjustments of how much distance and in which direction the display optical system 14r is to be moved to align the optical axis 142 with the pupil. Control signals are applied by one or more display adjustment mechanism drivers 245 to each of the components, e.g. motors 203, making up one or more display adjustment mechanisms 203. In the case of motors in this example, the motors move their shafts 205 to move the inner frame 117r in at least one direction indicated by the control signals. On the temple side of the inner frame 117r are flexible sections 215a, 215b of the frame 115 which are attached to the inner frame 117r at one end and slide within grooves 217a and 217b within the interior of the temple frame 115 to anchor the inner frame 117 to the frame 115 as the display optical system 14 is move in any of three directions for width, height or depth changes with respect to the respective pupil.

In addition to the sensor, the display optical system 14 includes other gaze detection elements. In this embodiment, attached to frame 117r on the sides of lens 118, are at least two (2) but may be more, infra-red (IR) illuminating devices 153 which direct narrow infra-red light beams within a particular wavelength range or about a predetermined wavelength at the user's eye to each generate a respective glint on a surface of the respective cornea. In other embodiments, the illuminators and any photodiodes may be on the lenses, for example at the corners or edges. In this embodiment, in addition to the at least 2 infra-red (IR) illuminating devices 153 are IR photodetectors 152. Each photodetector 152 is sensitive to IR radiation within the particular wavelength range of its corresponding IR illuminator 153 across the lens 118 and is positioned to detect a respective glint. As shown in FIGS. 4A-4C, the illuminator and photodetector are separated by a barrier 154 so that incident IR light from the illuminator 153 does not interfere with reflected IR light being received at the photodetector 152. In the case where the sensor 134 is an IR sensor, the photodetectors 152 may not be needed or may be an additional glint data capture source. With a visible light camera, the photodetectors 152 capture light from glints and generate glint intensity values.

In FIGS. 5A-5D, the positions of the gaze detection elements, e.g. the detection area 139 and the illuminators 153 and photodetectors 152 are fixed with respect to the optical axis of the display optical system 14. These elements may move with the display optical system 14r, and hence its optical axis, on the inner frame, but their spatial relationship to the optical axis 142 does not change.

FIG. 5B is a top view of another embodiment of a movable display optical system of a see-through, near-eye, mixed reality device including an arrangement of gaze detection elements. In this embodiment, light sensor 134r may be embodied as a visible light camera, sometimes referred to as an RGB camera, or it may be embodied as an IR camera or a camera capable of processing light in both the visible and IR ranges, e.g. a depth camera. In this example, the image sensor 134r is the detection area 139r. The image sensor 134 of the camera is located vertically on the optical axis 142 of the display optical system. In some examples, the camera may be located on frame 115 either above or below see-through lens 118 or embedded in the lens 118. In some embodiments, the illuminators 153 provide light for the camera, and in other embodiments the camera captures images with ambient lighting or light from its own light source. Image data captured may be used to determine alignment of the pupil with the optical axis. Gaze determination techniques based on image data, glint data or both may be used based on the geometry of the gaze detection elements.

In this example, the motor 203 in bridge 104 moves the display optical system 14r in a horizontal direction with respect to the user's eye as indicated by directional symbol 145. The flexible frame portions 215a and 215b slide within grooves 217a and 217b as the system 14 is moved. In this example, reflecting element 124a of an microdisplay assembly 173 embodiment is stationery. As the IPD is typically determined once and stored, any adjustment of the focal length between the microdisplay 120 and the reflecting element 124a that may be done may be accomplished by the microdisplay assembly, for example via adjustment of the microdisplay elements within the armature 137.

FIG. 5C is a top view of a third embodiment of a movable display optical system of a see-through, near-eye, mixed reality device including an arrangement of gaze detection elements. The display optical system 14 has a similar arrangement of gaze detection elements including IR illuminators 153 and photodetectors 152, and a light sensor 134r located on the frame 115 or lens 118 below or above optical axis 142. In this example, the display optical system 14 includes a light guide optical element 112 as the reflective element for directing the images into the user's eye and is situated between an additional see-through lens 116 and see-through lens 118. As reflecting element 124 is within the lightguide optical element and moves with the element 112, an embodiment of a microdisplay assembly 173 is attached on the temple 102 in this example to a display adjustment mechanism 203 for the display optical system 14 embodied as a set of three axis motor 203 with shafts 205 include at least one for moving the microdisplay assembly. One or more motors 203 on the bridge 104 are representative of the other components of the display adjustment mechanism 203 which provides three axes of movement 145. In another embodiment, the motors may operate to only move the devices via their attached shafts 205 in the horizontal direction. The motor 203 for the microdisplay assembly 173 would also move it horizontally for maintaining alignment between the light coming out of the microdisplay 120 and the reflecting element 124. A processor 210 of the control circuitry (see FIG. 7A) coordinates their movement.

Lightguide optical element 112 transmits light from microdisplay 120 to the eye of the user wearing head mounted display device 2. Lightguide optical element 112 also allows light from in front of the head mounted display device 2 to be transmitted through lightguide optical element 112 to the user's eye thereby allowing the user to have an actual direct view of the space in front of head mounted display device 2 in addition to receiving a virtual image from microdisplay 120. Thus, the walls of lightguide optical element 112 are see-through. Lightguide optical element 112 includes a first reflecting surface 124 (e.g., a mirror or other surface). Light from microdisplay 120 passes through lens 122 and becomes incident on reflecting surface 124. The reflecting surface 124 reflects the incident light from the microdisplay 120 such that light is trapped inside a planar, substrate comprising lightguide optical element 112 by internal reflection.

After several reflections off the surfaces of the substrate, the trapped light waves reach an array of selectively reflecting surfaces 126. Note that only one of the five surfaces is labeled 126 to prevent over-crowding of the drawing.

Reflecting surfaces 126 couple the light waves incident upon those reflecting surfaces out of the substrate into the eye of the user. More details of a lightguide optical element can be found in United States Patent Application Publication 2008/0285140, Ser. No. 12/214,366, published on Nov. 20, 2008, "Substrate-Guided Optical Devices" incorporated herein by reference in its entirety. In one embodiment, each eye will have its own lightguide optical element 112.

FIG. 5D is a top view of a fourth embodiment of a movable display optical system of a see-through, near-eye, mixed reality device including an arrangement of gaze detection elements. This embodiment is similar to FIG. 5C's embodiment including a light guide optical element 112. However, the only light detectors are the IR photodetectors 152, so this embodiment relies on glint detection only for gaze detection as discussed in the examples below.

In the embodiments of FIGS. 5A-5D, the positions of the gaze detection elements, e.g. the detection area 139 and the illuminators 153 and photodetectors 152 are fixed with respect to each other. In these examples, they are also fixed in relation to the optical axis of the display optical system 14.

In the embodiments above, the specific number of lenses shown are just examples. Other numbers and configurations of lenses operating on the same principles may be used. Additionally, in the examples above, only the right side of the see-through, near-eye display 2 are shown. A full near-eye, mixed reality display device would include as examples another set of lenses 116 and/or 118, another lightguide optical element 112 for the embodiments of FIGS. 5C and 5D, another micro display 120, another lens system 122, likely another environment facing camera 113, another eye tracking camera 134 for the embodiments of FIGS. 6A to 6C, earphones 130, and a temperature sensor 138.

Figure 6B:
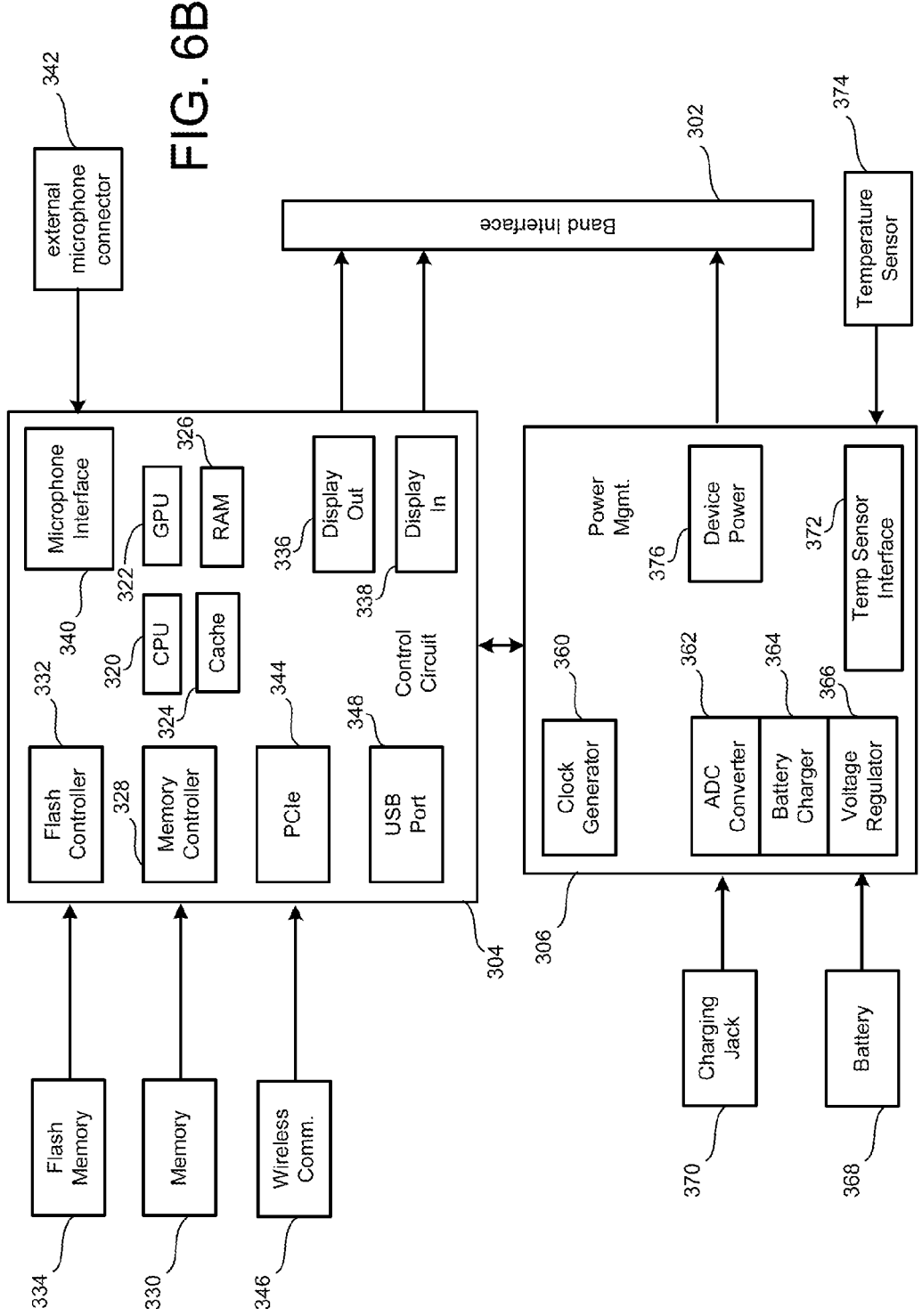
FIG. 6B is a block diagram of one embodiment of the hardware and software components of a processing unit associated with a see-through, near-eye, mixed reality display unit.

FIG. 6A is a block diagram of one embodiment of hardware and software components of a see-through, near-eye, mixed reality display unit 2 as may be used with one or more embodiments. FIG. 7B is a block diagram describing the various components of a processing unit 4, 5. In this embodiment, near-eye display device 2, receives instructions about a virtual image from processing unit 4, 5 and provides the sensor information back to processing unit 4, 5. Software and hardware components which may be embodied in a processing unit 4, 5 are depicted in FIG. 6B, will receive the sensory information from the display device 2 and may also receive sensory information from hub computing device 12 (See FIG. 1A). Based on that information, processing unit 4, 5 will determine where and when to provide a virtual image to the user and send instructions accordingly to the control circuitry 136 of the display device 2.

Note that some of the components of FIG. 6A (e.g., physical environment facing camera 113, eye camera 134, variable virtual focus adjuster 135, photodetector interface 139, micro display 120, illumination device 153 or illuminators, earphones 130, temperature sensor 138, display adjustment mechanism 203) are shown in shadow to indicate that there are at least two of each of those devices, at least one for the left side and at least one for the right side of head mounted display device 2. FIG. 6A shows the control circuit 200 in communication with the power management circuit 202. Control circuit 200 includes processor 210, memory controller 212 in communication with memory 214 (e.g., D-RAM), camera interface 216, camera buffer 218, display driver 220, display formatter 222, timing generator 226, display out interface 228, and display in interface 230. In one embodiment, all of components of control circuit 220 are in communication with each other via dedicated lines of one or more buses. In another embodiment, each of the components of control circuit 200 are in communication with processor 210.

Camera interface 216 provides an interface to the two physical environment facing cameras 113 and each eye camera 134 and stores respective images received from the cameras 113, 134 in camera buffer 218. Display driver 220 will drive microdisplay 120. Display formatter 222 may provide information, about the virtual image being displayed on microdisplay 120 to one or more processors of one or more computer systems, e.g. 4, 5, 12, 210 performing processing for the augmented reality system. Timing generator 226 is used to provide timing data for the system. Display out 228 is a buffer for providing images from physical environment facing cameras 113 and the eye cameras 134 to the processing unit 4, 5. Display in 230 is a buffer for receiving images such as a virtual image to be displayed on microdisplay 120. Display out 228 and display in 230 communicate with band interface 232 which is an interface to processing unit 4, 5.

Power management circuit 202 includes voltage regulator 234, eye tracking illumination driver 236, variable adjuster driver 237, photodetector interface 239, audio DAC and amplifier 238, microphone preamplifier and audio ADC 240, temperature sensor interface 242, display adjustment mechanism driver(s) 245 and clock generator 244. Voltage regulator 234 receives power from processing unit 4, 5 via band interface 232 and provides that power to the other components of head mounted display device 2. Illumination driver 236 controls, for example via a drive current or voltage, the illumination devices 153 to operate about a predetermined wavelength or within a wavelength range. Audio DAC and amplifier 238 receives the audio information from earphones 130. Microphone preamplifier and audio ADC 240 provides an interface for microphone 110. Temperature sensor interface 242 is an interface for temperature sensor 138. One or more display adjustment drivers 245 provide control signals to one or more motors or other devices making up each display adjustment mechanism 203 which represent adjustment amounts of movement in at least one of three directions. Power management unit 202 also provides power and receives data back from three axis magnetometer 132A, three axis gyro 132B and three axis accelerometer 132C. Power management unit 202 also provides power and receives data back from and sends data to GPS transceiver 144.

The variable adjuster driver 237 provides a control signal, for example a drive current or a drive voltage, to the adjuster 135 to move one or more elements of the microdisplay assembly 173 to achieve a displacement for a focal region calculated by software executing in a processor 210 of the control circuitry 13, or the processing unit 4,5 or the hub computer 12 or both. In embodiments of sweeping through a range of displacements and, hence, a range of focal regions, the variable adjuster driver 237 receives timing signals from the timing generator 226, or alternatively, the clock generator 244 to operate at a programmed rate or frequency.

The photodetector interface 239 performs any analog to digital conversion needed for voltage or current readings from each photodetector, stores the readings in a processor readable format in memory via the memory controller 212, and monitors the operation parameters of the photodetectors 152 such as temperature and wavelength accuracy.

FIG. 6B is a block diagram of one embodiment of the hardware and software components of a processing unit 4 associated with a see-through, near-eye, mixed reality display unit. The mobile device 5 may include this embodiment of hardware and software components as well as similar components which perform similar functions. FIG. 6B shows controls circuit 304 in communication with power management circuit 306. Control circuit 304 includes a central processing unit (CPU) 320, graphics processing unit (GPU) 322, cache 324, RAM 326, memory control 328 in communication with memory 330 (e.g., D-RAM), flash memory controller 332 in communication with flash memory 334 (or other type of non-volatile storage), display out buffer 336 in communication with see-through, near-eye display device 2 via band interface 302 and band interface 232, display in buffer 338 in communication with near-eye display device 2 via band interface 302 and band interface 232, microphone interface 340 in communication with an external microphone connector 342 for connecting to a microphone, PCI express interface for connecting to a wireless communication device 346, and USB port(s) 348.

In one embodiment, wireless communication component 346 can include a Wi-Fi enabled communication device, Bluetooth communication device, infrared communication device, etc. The USB port can be used to dock the processing unit 4, 5 to hub computing device 12 in order to load data or software onto processing unit 4, 5, as well as charge processing unit 4, 5. In one embodiment, CPU 320 and GPU 322 are the main workhorses for determining where, when and how to insert images into the view of the user.

Power management circuit 306 includes clock generator 360, analog to digital converter 362, battery charger 364, voltage regulator 366, see-through, near-eye display power source 376, and temperature sensor interface 372 in communication with temperature sensor 374 (located on the wrist band of processing unit 4). An alternating current to direct current converter 362 is connected to a charging jack 370 for receiving an AC supply and creating a DC supply for the system. Voltage regulator 366 is in communication with battery 368 for supplying power to the system. Battery charger 364 is used to charge battery 368 (via voltage regulator 366) upon receiving power from charging jack 370. Device power interface 376 provides power to the display device 2.

The Figures above provide examples of geometries of elements for a display optical system which provide a basis for different methods of aligning an IPD as discussed in the following Figures. The method embodiments may refer to elements of the systems and structures above for illustrative context; however, the method embodiments may operate in system or structural embodiments other than those described above.

The method embodiments below identify or provide one or more objects of focus for aligning an IPD. FIGS. 8A and 8B discuss some embodiments for determining positions of objects within a field of view of a user wearing the display device.

Figure 7:
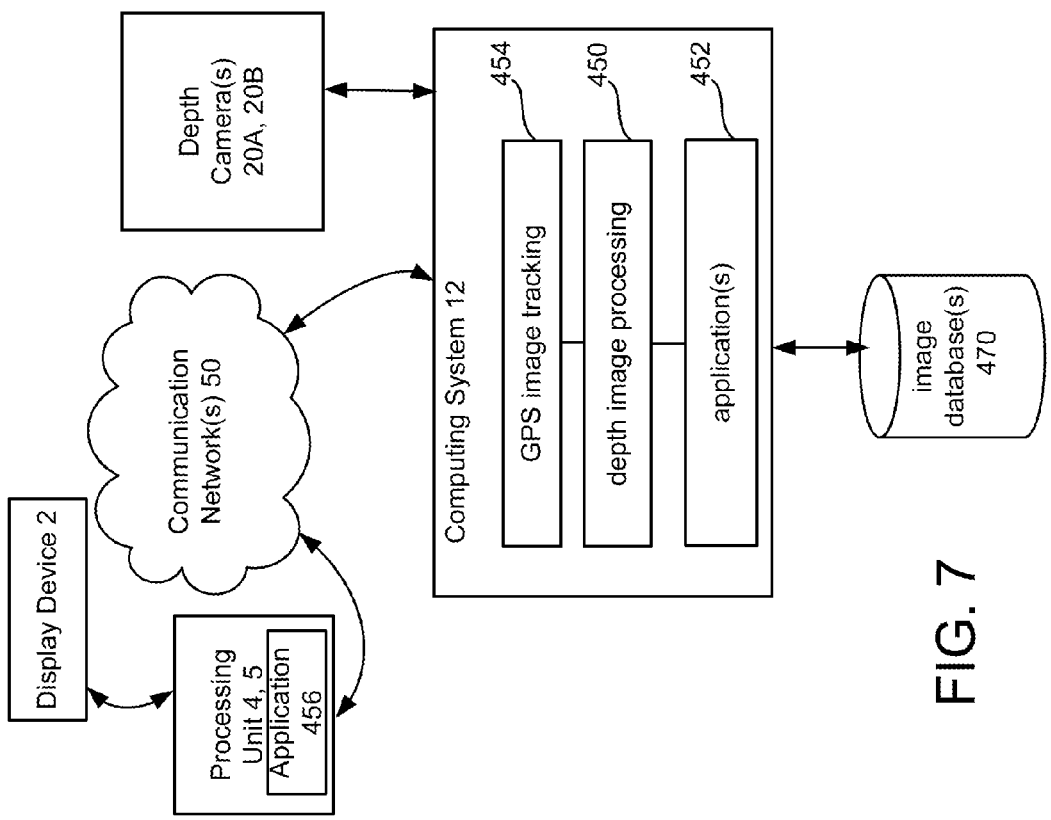
FIG. 7 is a block diagram of a system embodiment for determining positions of objects within a user field of view of a see-through, near-eye, mixed reality display device.

FIG. 7 is a block diagram of a system embodiment for determining positions of objects within a user field of view of a see-through, near-eye, mixed reality display device. This embodiment illustrates how the various devices may leverage networked computers to map a three-dimensional model of a user field of view and the real and virtual objects within the model. An application 456 executing in a processing unit 4,5 communicatively coupled to a display device 2 can communicate over one or more communication networks 50 with a computing system 12 for processing of image data to determine and track a user field of view in three dimensions. The computing system 12 may be executing an application 452 remotely for the processing unit 4,5 for providing images of one or more virtual objects. As mentioned above, in some embodiments, the software and hardware components of the processing unit are integrated into the display device 2. Either or both of the applications 456 and 452 working together may map a 3D model of space around the user. A depth image processing application 450 detects objects, identifies objects and their locations in the model. The application 450 may perform its processing based on depth image data from depth camera such as cameras 20A and 20B, two-dimensional or depth image data from one or more front facing cameras 113, and GPS metadata associated with objects in the image data obtained from a GPS image tracking application 454.

The GPS image tracking application 454 identifies images of the user's location in one or more image database(s) 470 based on GPS data received from the processing unit 4,5 or other GPS units identified as being within a vicinity of the user, or both. Additionally, the image database(s) may provide accessible images of a location with metadata like GPS data and identifying data uploaded by users who wish to share their images. The GPS image tracking application provides distances between objects in an image based on GPS data to the depth image processing application 450. Additionally, the application 456 may perform processing for mapping and locating objects in a 3D user space locally and may interact with the GPS image tracking application 454 for receiving distances between objects. Many combinations of shared processing are possible between the applications by leveraging network connectivity.

Figure 8:
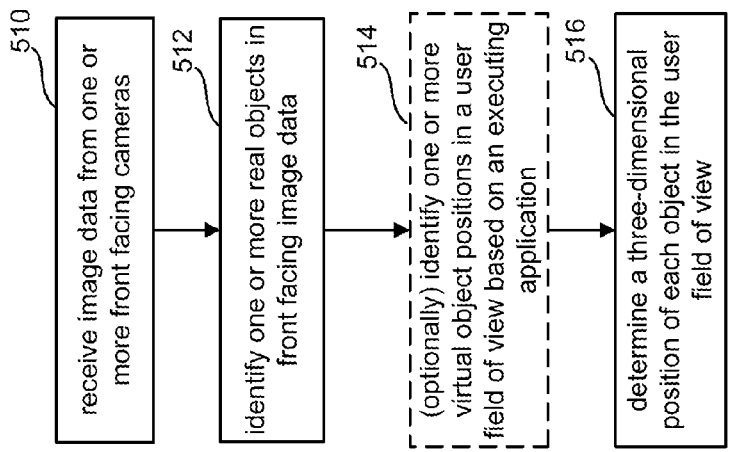
FIG. 8 is a flowchart of a method embodiment for determining a three-dimensional user field of view of a see-through, near-eye, mixed reality display device.

FIG. 8 is a flowchart of a method embodiment for determining a three-dimensional user field of view of a see-through, near-eye, mixed reality display device. In step 510, one or more processors of the control circuitry 136, the processing unit 4,5, the hub computing system 12 or a combination of these receive image data from one or more front facing cameras 113, and in step 512 identify one or more real objects in front facing image data. Based on the position of the front facing camera 113 or a front facing camera 113 for each display optical system, the image data from the front facing camera approximates the user field of view. The data from two cameras 113 may be aligned and offsets for the positions of the front facing cameras 113 with respect to the display optical axes accounted for. Data from the orientation sensor 132, e.g. the three axis accelerometer 132C and the three axis magnetometer 132A, can also be used with the front facing camera 113 image data for mapping what is around the user, the position of the user's face and head in order to determine which objects, real or virtual, he or she is likely focusing on at the time. Optionally, based on an executing application, the one or more processors in step 514 identify virtual object positions in a user field of view which may be determined to be the field of view captured in the front facing image data. In step 516, a three-dimensional position is determined for each object in the user field of view. In other words, where each object is located with respect to the display device 2, for example with respect to the optical axis 142 of each display optical system 14.

In some examples for identifying one or more real objects in the front facing image data, GPS data via a GPS unit, e.g. GPS unit 965 in the mobile device 5 or GPS transceiver 144 on the display device 2 may identify the location of the user. This location may be communicated over a network from the device 2 or via the processing unit 4,5 to a computer system 12 having access to a database of images 470 which may be accessed based on the GPS data. Based on pattern recognition of objects in the front facing image data and images of the location, the one or more processors determines a relative position of one or more objects in the front facing image data to one or more GPS tracked objects in the location. A position of the user from the one or more real objects is determined based on the one or more relative positions.

In other examples, each front facing camera is a depth camera providing depth image data or has a depth sensor for providing depth data which can be combined with image data to provide depth image data. The one or more processors of the control circuitry, e.g. 210, and the processing unit 4,5 identify one or more real objects including their three-dimensional positions in a user field of view based on the depth image data from the front facing cameras. Additionally, orientation sensor 132 data may also be used to refine which image data currently represents the user field of view. Additionally, a remote computer system 12 may also provide additional processing power to the other processors for identifying the objects and mapping the user field of view based on depth image data from the front facing image data.

In other examples, a user wearing the display device may be in an environment in which a computer system with depth cameras, like the example of the hub computing system 12 with depth cameras 20A and 20B in system 10 in FIG. 1A, maps in three-dimensions the environment or space and tracks real and virtual objects in the space based on the depth image data from its cameras and an executing application. For example, when a user enters a store, a store computer system may map the three-dimensional space. Depth images from multiple perspectives, include depth images from one or more display devices in some examples, may be combined by a depth image processing application 450 based on a common coordinate system for the space. Objects are detected, e.g. edge detection, in the space, and identified by pattern recognition techniques including facial recognition techniques with reference images of things and people from image databases. Such a system can send data such as the position of the user within the space and positions of objects around the user which the one or more processors of the device 2 and the processing unit 4,5 may use in detecting and identifying which objects are in the user field of view. Furthermore, the one or more processors of the display device 2 or the processing unit 4,5 may send the front facing image data and orientation data to the computer system 12 which performs the object detection, identification and object position tracking within the user field of view and sends updates to the processing unit 4,5.

FIG. 9 shows an exemplary architecture of a system for implementing one or more processes and/or software running on a translation server 903. The translation server 903 may comprise a personal computing device of any of the embodiments described herein including processing device 4, or may comprise a series of computing devices organized into a hosted translation server. Translation server 903 may create and provide translations, or may provide services which transmit translations and supplementary information from third party translation or information services to a user's personal A/V apparatus 902. Multiple translation providers and third party data providers may be utilized with the present technology.

Translation server 903 includes a controller 904 comprising a series of applications and functional components implementing translations in accordance with the teachings herein. Event and/or location data can include event and location data 910 about one or more events and locations for which a user may require translation service. For known events (such as conferences or pre-scheduled presentations), translation processing can occur prior to the event for items that will be presented. Likewise, for known locations, such as countries a user will be visiting, translation data can be acquired prior to the time the translation is needed. Events and locations known to occur within specific periods and/or about one or more locations can be used to enhance the translation experience. User location and tracking module 912 keeps track of various users which may be utilizing the system. Users can be identified by unique user identifiers, location and other elements. An information display application 914 allows customization of both the type of display information to be provided to users and the manner in which it is displayed. The information display application 914 can be utilized in conjunction with an information display application on the personal A/V apparatus 902. In one embodiment, the display processing occurs at the translation server 903. In alternative embodiments, information is provided to personal A/V apparatus 902 so that personal A/V apparatus 902 determines which information should be displayed and where, within the display, the information should be located. Third party supplemental information providers 940 can provide various types of data for various types of events, as discussed herein.

Various types of information display applications can be utilized in accordance with the present technology. Different applications can be provided for different events and locations. Different providers may provide different applications for the same live event. Applications may be segregated based on the amount of information provided, the amount of interaction allowed or other feature. Applications can provide different types of experiences within the event or location, and different applications can compete for the ability to provide information to users during the same event or at the same location. Application processing can be split between the application on the controller supplemental information providers 904 and on the personal A/V apparatus 902.

The applications can present translations in audio, visual and a combination of audio visual formats. Visual translations can include animations as well as controls allowing the user to obtain additional information about the translation.

User profile data 922 contains information allowing the translation server to provide accurate translations for the user. This can include not only what languages the user can understand, but also whether the user is sight or sound impaired, the level of education of the user, the type of education of the user, the user's work background and experience, and any other data bearing on the user's ability to understand data input received by a personal AV device 902 which may require translation for the user.

Authorization control 916 ensures that only users authorized to receive translation information actually receive that information. This can be important where the translation server is part of a service provided for a fee, or where the translation server is used as part of a presentation that includes information for which the presenter wishes to limit the dissemination.

Translation engine 918 performs the various translations described herein. For language translation, one or more forms of statistical machine translation may be used to generate translations based on patterns found in large amounts of text. This includes vocabulary and a set of rules as well as exceptions to the rules. For context translations, the inputs may be images and user characteristics which are correlated to knowledge about the user the translation is provided to, as described below.

It should be understood that the translation server 903 may comprise any one or more of the processing devices described herein, or a plurality of processing devices coupled via one or more public and private networks 906 to users having person audio/visual apparatuses 902, 902a which may include one or more see through head mounted displays 2.

FIG. 10 is a method in accordance with the present technology for implementing translations for a see-through head-mounted display such as display 2. At step 1002, the location orientation and gaze of the user is determined. Techniques for determining the location orientation and gaze of the user are discussed below and co-pending U.S. patent application Ser. No. 13/221,739 entitled Gaze Detection In A See-Through, Near-Eye, Mixed Reality Display; U.S. patent application Ser. No. 13/221,707 entitled Adjustment Of A Mixed Reality Display For Inter-Pupillary Distance Alignment; and U.S. patent application Ser. No. 13/221,662 entitled Aligning Inter-Pupillary Distance In A Near-Eye Display System, all of which are hereby incorporated specifically by reference.

At step 1004, the user profile is accessed and personal information is obtained to determine whether translation is desired by the user given the user's location orientation and gaze. Alternatively, the user can manually request the data input to the see-through head-mounted display 2 be translated. At step 1006, audio and gaze data is filtered based on the user profile, location, and information in the data input to determine the translation type and context which is needed. The technology provided herein is capable of not merely linguistic translations, translating from one language input to a second language output, but also informative translations. If, for example, a presenter is discussing Einstein's Theory of Relativity, the system can note the type of input provided, and provide a wearer with links to additional information explaining concepts of Einstein's Theory of Relativity. Where, for example, where the wearer is a high school student, links to more rudimentary articles discussing the subject of relativity can be provided. Where the wearer is an educated physicist, more advanced links can be provided. It should be understood that steps 1002, 1004, and 1006 may be performed simultaneously or in alternative orders. That is, as briefly alluded to above, the user profile may be accessed at 1004 and a determination made at 1006 that a user will be traveling to a different country. In advance of the user traveling to a different country where the user might not understand the language, language data for that country can be retrieved and cached for use by the translation engine 916 based on access to the schedule. In this example, profile access occurs before determination of location, orientation and gaze.

Similarly, if the user's schedule is accessed at 1004 and it is noted that the user is about to attend a conference on special relativity, advanced data concerning the most recent articles analyzing relativity, or specific articles or presentations which are being provided by the conference presenter can be downloaded and made available to the translation engine prior to the time it may be required at the conference. Advanced translation and materials can then occur by the translation engine and be presented more rapidly by any information display application 914.

Returning to FIG. 10, once the nature and context of translations are determined, then, at step 1008, for each input into the user's field of view in a display apparatus 2, a translation is made based on the user profile settings and the context of the input. Translation is rendered in an appropriate format in the see-through head-mounted display 2 using visual and/or audio presentations at step 1010. Accuracy feedback of the translation may be received at 1012.

In addition to user profile information being provided at step 1006, user training information can be provided. For example, if the user is a teacher and wishes to ensure that his students are able to read his writing on a whiteboard, the user can train the system as discussed below, to understand and translate the writing on the user's board. As such, the translation may not merely be from one language to another, but from the handwriting which may for some be illegible, to legibly provided written text.

FIGS. 11A through 13 provide examples of the type of translations which may occur.

Figure 11A:
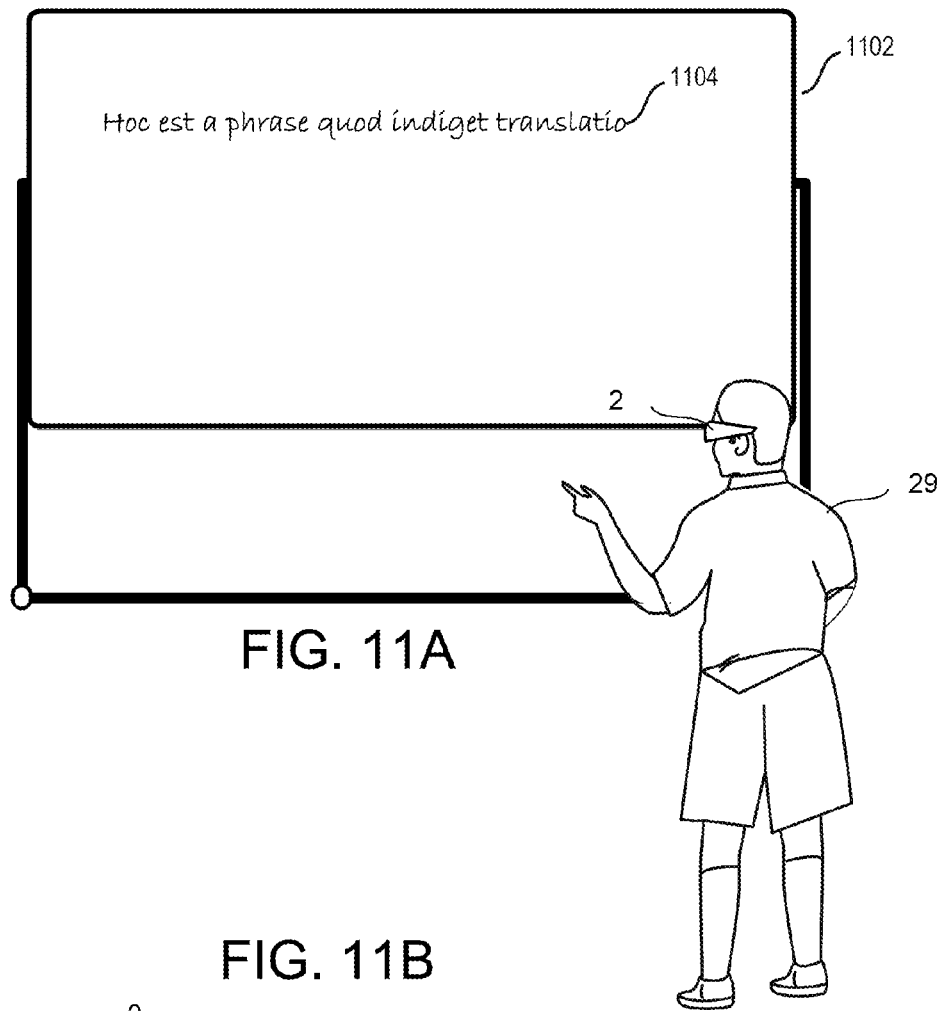
FIG. 11A is a prospective view of the user in front of a whiteboard.
Figure 11B:
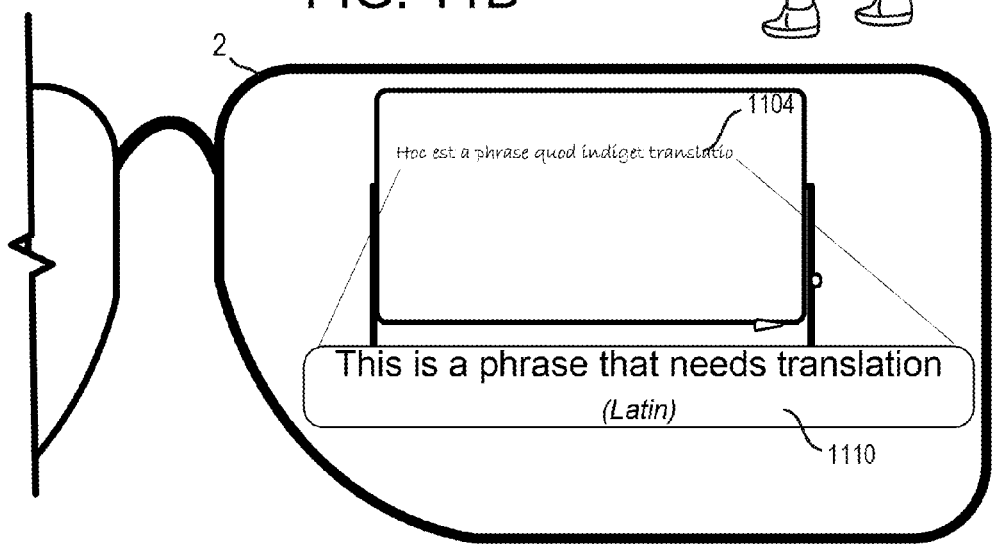
FIG. 11B is a through-the-lens view of the view of the user 29 in FIG. 11A.

FIG. 11A illustrates a user 29 for the see-through head-mounted display 2 and processing device 4 in front of a whiteboard 1102. The user has written the phrase "hoc est a phrase quod indiget translatio." This phrase, in Latin, means "this is a phrase that needs translation". As illustrated in FIG. 11B, which is the view of a wearer of a head-mounted display 2, the phrase 1104 can be translated and presented in written form at 1110, along with an indication that the phrase 1104 is in Latin. In an alternative embodiment, the translation may be presented in an audio format. In a basic linguistic translation, the translation can take place based on a user's focus on the phrase, the system having determined based on gaze and orientation that the user has read the phrase. In addition, the system can translate as much of the input as it receives as the writer provides various phrases (not necessarily in the gaze of the user) onto the whiteboard, in preparation for a user's gaze at such phrase. That is, as any phrase is written onto whiteboard 1102, the translation engine can create the translation components where access to the user's location and user profile have indicated that a linguistic translation is likely to be required.

In another example, where a wearer is creating the input data—such as composing a document in a word processing application in one language with that applications correction features enabled—corrections can be suggested to supplement the application. For example, where the above Latin phrase is inserted into a document composed in English, the system can recognized the different language and check the correctness of the insertion relative to the new language. If an error occurs in the inserted language, the system can highlight the error and suggested fix in the display rather than in the application.

FIG. 12A illustrates the same user and whiteboard, but in this case multiple translatable items—a series of drawings 1202, as well as two different phrases 1204 and 1206—have been provided on whiteboard 1102. While a linguistic translation may be provided, in the example shown, examination of the user's schedule has shown that the user is in attendance at a lecture on Relativity. As the user gazes upon the writing section 1204 on the whiteboard, the system can either literally translate text, or, as shown in FIG. 12B, perform a contextual (or informational) translation of the text 1204. In this example, the text deals with the Theory of Relativity, and based on knowledge of the users' education level, a determination is made that the user requires a basic definition 1210 of the concept of Relativity. The text 1210 which appears in the user's display 2, is a first sentence of an article which appears in a third-party data source, in this case WIKIPEDIA® and includes a link 1214 to provide the user with additional info regarding the Theory of Relativity. In this case, because the user is in attendance at a lecture, the system will prepare to translate concepts and writings as well as audio which a presenter may provide concerning the Theory of Relativity into an intelligent translation for the user 29. In addition, because additional information may be needed by the user, suggestions for additional information provided in the translation include searches or third party data which provide additional information for the user to view. Additional types of information may include social sourced data from a user's social network connections. For example, a social connection's recent posts on social networks such as FACEBOOK® or TWITTER® on the subject of the translation (here, Relativity) may be gathered and presented by the system.

Similarly, as shown in FIG. 12C, drawings 1202 can be analyzed and information culled for translation. For example, drawings 1202 are found to include formulas and other graphics. Performing an optical text recognition on the drawing 1202 as well as image analysis, the system can determine, as shown at 1220, that the formula appears to include the phrase $E=MC^2$ and provide a link 1222 to allow the user to ascertain more info regarding the display. The "more info" link can retrieve additional information from other third-party data sources to which the user has subscribed or to which the translation server has determined to be relevant to the particular subject matter of the presentation on whiteboard 1102.

FIG. 13 shows yet another alternative of the technology wherein an audio translation can be performed to provide an audio output, a visual output or a combination of both. In FIG. 13, user 28 utters the phrase "Je m'appelle Laurent." As illustrated in the display 2, the phrase "Je m'appelle Laurent" translates to "My name is Laurence." This translation can be displayed at 1302 either on a visual presentation, or can be provided as audio to the wearer of a device 2.

FIG. 14 illustrates one embodiment of the method of FIG. 10 in additional detail.

To determine user location orientation and gaze 1002, at 1402, user location can be retrieved from GPS and other location-based data. For example, the system may make a coarse determination by determining that a user's processing device is connected to the user's own Wi-Fi network, placing the user at a particular geographic location of their home. The system can then use depth data from the depth cameras discussed above with respect to FIG. 1a, and GPS information to more accurately determine the exact position of a user within the environment the user is placed.

At steps 1404 through 1412, a method of determining gaze and identifying objects within a user's profile is provided. The method provides an overall view of how a near-eye display device can leverage its geometry of optical components to determine gaze and depth change between the eyeball and the display optical system. One or more processors of the mixed reality system such as processor 210 of the control circuitry in mobile processing unit 4, mobile device 5, or the hub computing system 12 can determine at step 1404 boundaries for a gaze detection coordinate system. In 1406, a gaze vector for each eye is determined based on reflected eye data, including glints, and in step 1408, a point of gaze e.g. what the user is looking at, is determined for the two eyes in a three-dimensional user field of view. As positions and identity of objects in the user's field of view are tracked, any object at a point of gaze in the 3-D user field of view is identified. In many embodiments, the user three-dimensional field of view includes displayed virtual objects in actual direct views of real objects. The term object, as used herein, includes a person. At 1410, objects at the point of gaze in the 3-D's field of view are identified. At 1412, data on the user's gaze is retrieved. Objects which are the subject of the user's point of gaze are determined at 1412 and used to identify the objects in the user's field of view.

Once the user's gaze and objects are determined, and returning to FIG. 14 an automatic determination of whether a translation might be needed, at 1004, or a manual determination of a request for translation is received. At 1004, a user can issue a manual command to the translation server requesting translation of data input to the device. The command can be a general command indicating that the user wishes all gazes hereafter to be translated, or can be a specific command to "translate a specific sentence" when the user is gazing at the sentence.

At 1006, the user profile may be parsed for the user's schedule, native languages, known languages, education level, occupation, employment history, and any other data bearing on whether a translation would be needed. Using this information, the system can determine whether or not translation data should be prepared or the subsequent steps 1008 and 1010 should be implemented to begin translation of data in the user's field of view. And again, it should be recognized that the sequence of steps outlined at 1002, 1004, and 1006 can be performed simultaneously and continuously to determine whether a user's translation is needed at any particular time.

In order to translate inputs to the user's field of view based a user profile and context, at step 1428 for each data focus, the input type is determined at step 1430 based on the data in the user focus. Note that the input type can be audio or visual input and can be a determination of whether or not the input is to be linguistic, informational, or contextual. Linguistic determinations are translations requiring a change from one language to another. Knowledge addition translations are those requiring a provision of additional information regarding a particular subject or scene. Contextual translations, discussed below, are determinations of factors bearing on another user's context, mood or emotion. As discussed below, through the use of visual clues, a particular emotional state or feeling of a second user can be suggested through the user in the form of a "translation" of these factors to the current user's view.

At 1432, a determination is made as to whether or not the input (verbal, written or other) needs translation. Not all items within a user's field of view will require translation. For example, if the user is at a presentation in a foreign country, and the speaker speaks in a foreign language, this may require translation. However if the speaker utters some phrases in the user's native language, these phrases would not need translation. Similarly, if the user profile indicates the wearer knows the speaker's language, no translation would be necessary. At 1434, for each input needing translation, translation information is queried at 1436 and for each input in the user's field of view at 1438 translation is made based on the user profile settings. At 1440, the best output format for the translated information is determined. Audio format, for example, can be translated into alternative audio formats or written format for display in the user's display 2. Likewise written information can be translated into audio form. At 1442, any conflicts with other translated information will be resolved. For example, in the example shown in FIG. 12A, multiple types of information may require translation. User preferences and conflict resolution rules can be used to determine which information, whether written or graphical, should be translated first. Alternative conflict rules can include those defined by a presenter. Alternatively, a user's disabilities can be taken into account to determine which types of information should be presented first. At 1444, an audio or visual, language, context or knowledge translation is then rendered in the display device 2.

Figure 15:
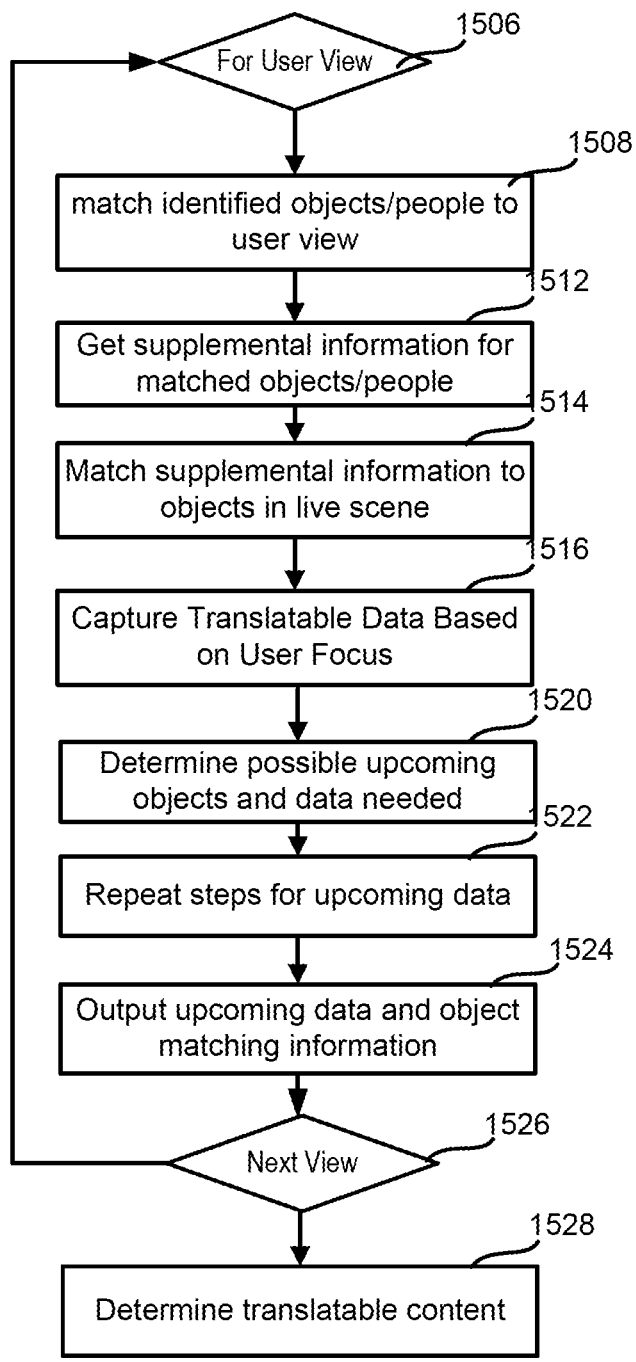
FIG. 15 is a flowchart illustrating a method for performing a determination of input which needs translation.

FIG. 15 illustrates one alternative for implementing step 1434 to determine which objects in a user's view need translation. For each user view at 1506, identified objects and identified people are matched in a user's view at 1508. Supplemental information for matched objects and people is gathered at 1512. This can include languages spoken by the third-party participants, or language written by the third-party participants in a visual format. At 1514, supplemental information can be provided and matched to objects in the live scene the user is viewing. At 1516, translatable data is captured based on the user's focus. Translatable data can include both audio data focused on what the user is looking at as well as written data captured by the onboard cameras of the display device 2. At 1520, possible upcoming objects and data to which translation may be needed can be determined. As a user scans a room, translation may occur based on what the user is focused on at any given point in time. However, any of the above camera connected devices can also capture other information which is in the scene.

Returning to the example shown in FIG. 12A, the device will capture all three components that are shown on the whiteboard both the drawing data 1202, the written data 1204 and the written data 1206. When the user gazes at the graphical data 1202, the user needs to be presented with a translation of the data at 1202, however the information at 1204 and 1206 can be translated into the background and prepared for rendering at 1520. At 1522, steps 1512, 1514 and 1516 are repeated for all possible upcoming data items which need to be translated. At 1524, upcoming data and optic matching information is output to the local device for rendering. This method returns at 1526 for the next user view and translatable content is determined at 1528.

Figure 16:
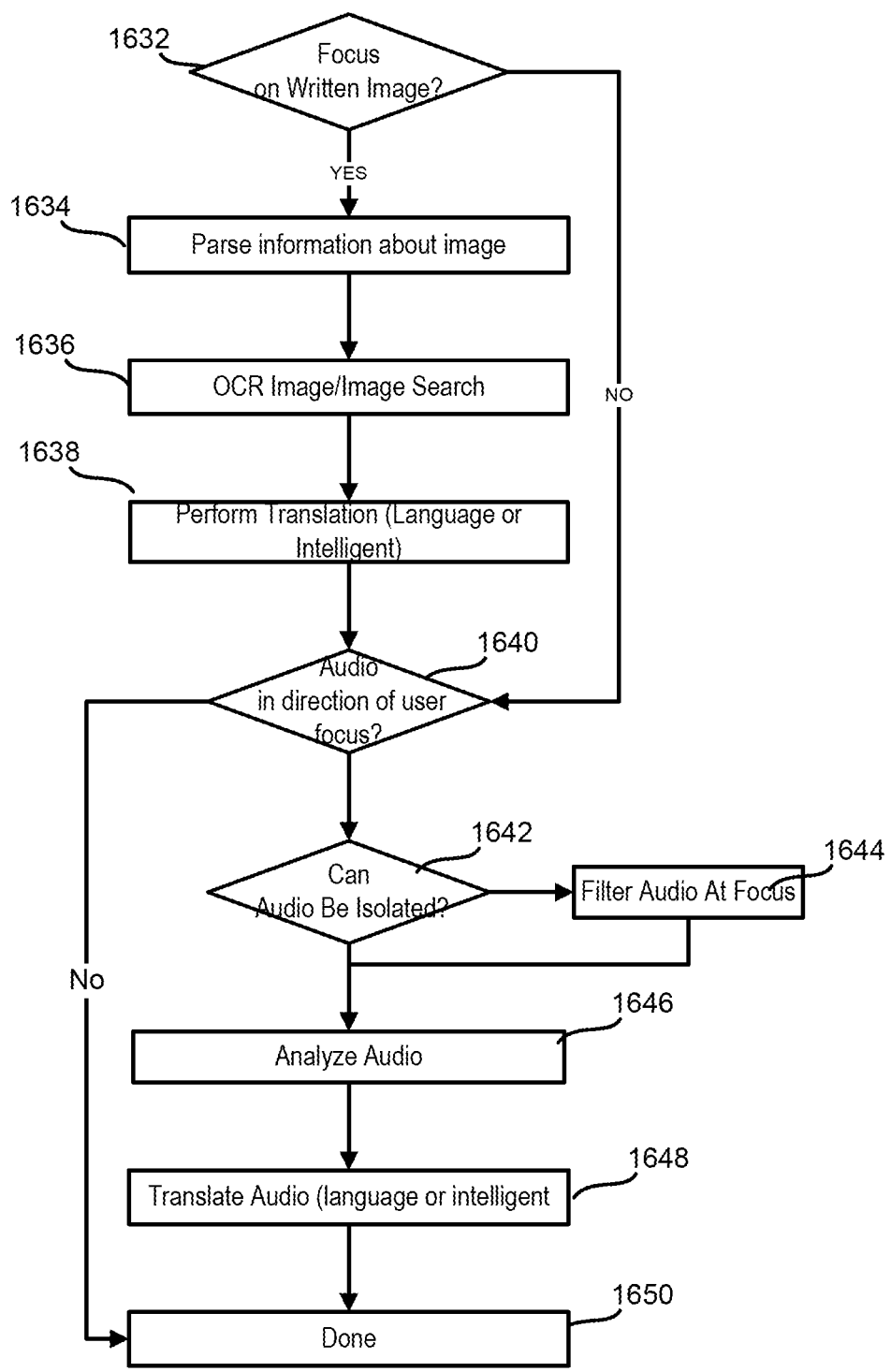
FIG. 16 is a method illustrating translation in accordance with step 1438 in Step 14.

FIG. 16 shows one method for implementing step 1438 in FIG. 14. FIG. 14 illustrates a method for translating written and audio data based on the data input to the display device 2. At 1632, the user focuses on a written image at 1634 and information about the focus of the user's gaze is parsed. This can include image recognition techniques determining which types of images the user is looking at, an image data search using known techniques, and a determination of whether or not written information is in the image data retrieved. At 1636, if image data includes written information, optical character recognition and image search data can be performed. At 1638, a translation of the data in the image, whether a language, or character or intelligent translation, can be performed. If the user has not focused on a written image or if there is additionally audio information which requires translation, then at 1640 an audio translation process begins. At 1642 an initial determination is made as to whether or not the audio can be isolated. Depending on whether the display device 2 is outfitted with directional microphones, if the user focuses on a particular audio source, then a filtering may occur at 1644 to increase the resolution of the input audio to the user device. At 1646, the audio is analyzed for translatable data and the audio translated at 1648. At 1650 the method is complete for each segment of audio or visual data retrieved by the user.

Figure 17:
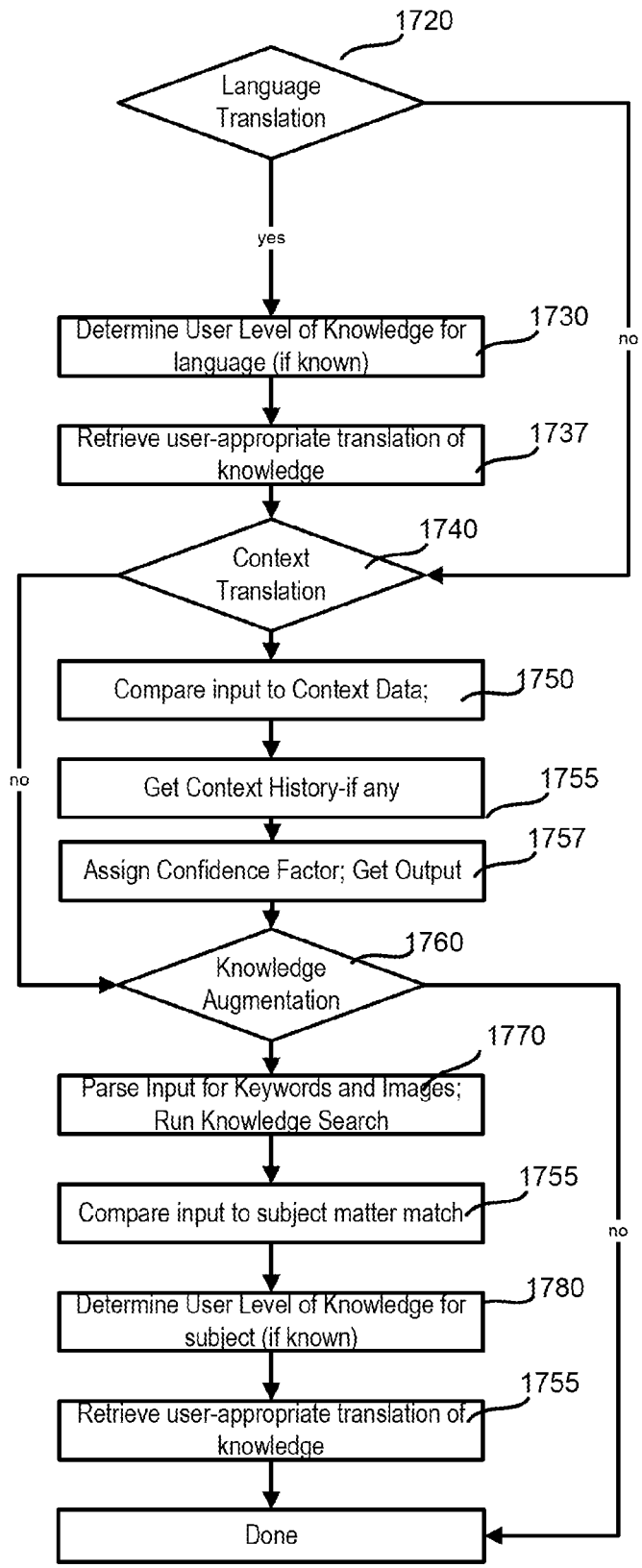
FIG. 17 is a flowchart illustrating a method for determining whether and what type of translation is required.

FIG. 17 illustrates a method for performing translations, such as required at steps 1638 and 1648 of FIG. 16. FIG. 17 includes determination of whether or not a language, information or context translation is necessary or likely. If a language translation is needed 1720, then at 1730 the user's level of knowledge of the language is determined and at 1737, the input is translated into a user appropriate language level. If no language translation is necessary or if the context translation is also needed, then at 1740 a context translation is performed. For a context translation, at 1750, data input from the user gaze is compared to known reactions and characteristics of users, discussed below with respect to FIG. 18, and other contextual factors such as time, place, weather, events and surroundings. At 1755, any context translation history for a user on whom the context translation is being performed is retrieved. This can include previous context translations as well as user feedback on the accuracy of the context translations. At 1757, a context translation is performed and a confidence value of the translation is assigned.

A context translation can account for nuances in the same language. For example, differences between British English and American English, where different words might be used for some items (such as "boot" for a car "trunk"). This can include indications of cultural nuances such as the acceptability of the use of where use of colorful or profane language. By accessing our user profile data the system could alert the listener of the conversation as to how much emphasis was really meant on a phrase based on the background data of the speaker. In another example, the use of sporting or cultural icons as illustration points can be translated. In a conversation about "Football", a user profile of a person from Europe would allow recognition that the speaker is likely referring to soccer, while that of an American would recognize the speaker is referring to American Football. Likewise, the system could recognize the reference between style approaches comparing Ichiro Suzuki's playing style to that of Barry Bonds (U.S. Baseball Players) and translate that to a soccer analogy of "Michel Platini" and "Vinny Jones".

At 1760, if no context translation is necessary or if a knowledge augmentation is also needed, a knowledge translation or informational translation may be performed. Knowledge augmentation can include adding information to the context of an event, such as that shown above with respect to FIG. 12B, wherein a rudimentary definition of the Theory of Relativity is provided. If knowledge augmentation is necessary, the input is parsed for key words, images and a knowledge search is performed at 1770. At 1775, the input is compared to subject matter information (employment and education) for the user to determine the user's level of knowledge about the subject at 1780. At 1785, appropriate level of knowledge information is assigned for output to the user in the display 2.

Figure 18A:
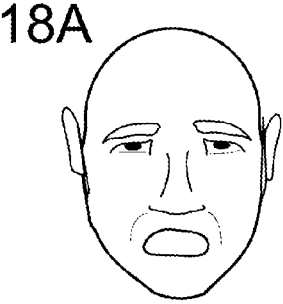
FIG. 18 is a depiction of user expressions and body language utilized in performing a context determination.
Figure 18B:
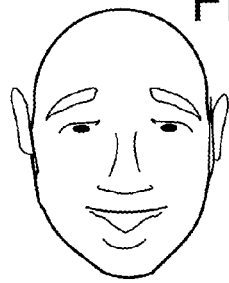
Figure 18C:
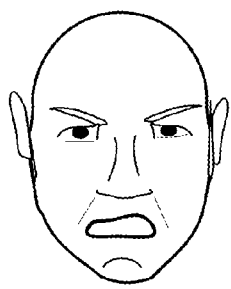
Figure 18D:
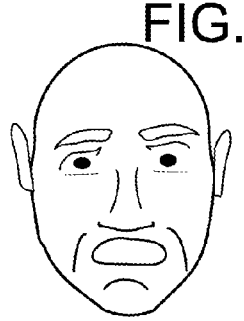
Figure 18E:
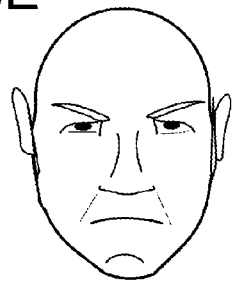
Figure 18F:
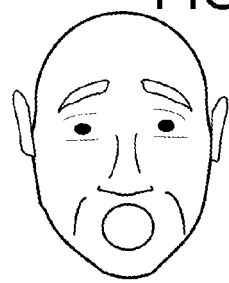
Figure 18G:
Figure 18H:
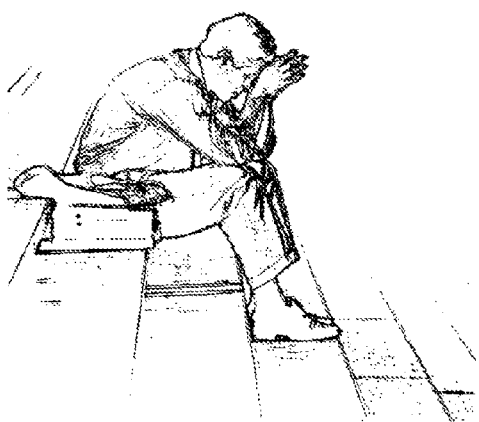

FIG. 18A through 18G illustrates various different types of contextual input which may be ascertained by the present technology. FIG. 18A through 18F illustrate facial expressions of a user. Each facial expression can be parsed based on, for example, eye shape, mouth shape, and brow location. FIG. 18A illustrates sadness while 18B illustrates happiness. FIG. 18C illustrates anger while 18D illustrates fear. FIG. 18E illustrates disgust while 18F illustrates surprise. The difference in each of the figures is the shape of the eyes, the position of the eyebrows, the shape of the mouth, and whether the mouth is open or closed and whether the eyes are open and closed. The relation of spontaneous expressions to emotion is precise and refined with different expressions corresponding to distinct emotions. Even subtle differences in one expression (i.e., intensity, duration, frequency) correspond to differences in the feelings of the corresponding emotion. The symmetry of expression may reveal whether it is spontaneous and emotional or more deliberate and cortically mediated. Using any number of known classifications systems for facial expressions, evaluated by matching the characteristics of the retrieved, focus data against such systems, is one manner of performing a context translation and providing supplemental information to a wearer. Using each of these particular characteristics of facial expression the system can, based on either known images of the user being analyzed or general characteristics of all users, determine whether or not the subject which is being viewed by the user of the display device 2 exhibits a particular emotional state. This emotional "translation" can be weighted and a determination made of whether or not the system is accurately characterizing the state of the user. Body position can also be used for emotional translations. As shown in FIG. 18G where a user is exhibiting joy with his arms over his head or a slouch position as in 18H, body position can also add to the emotional state of the user. The wearer of the display device 2 can be provided with a pop-up, similar to that illustrated with respect to FIGS. 11B and 12B with the system translation of the state of the subject as well as the conference value attributed to the state of the translation.

Figure 19:
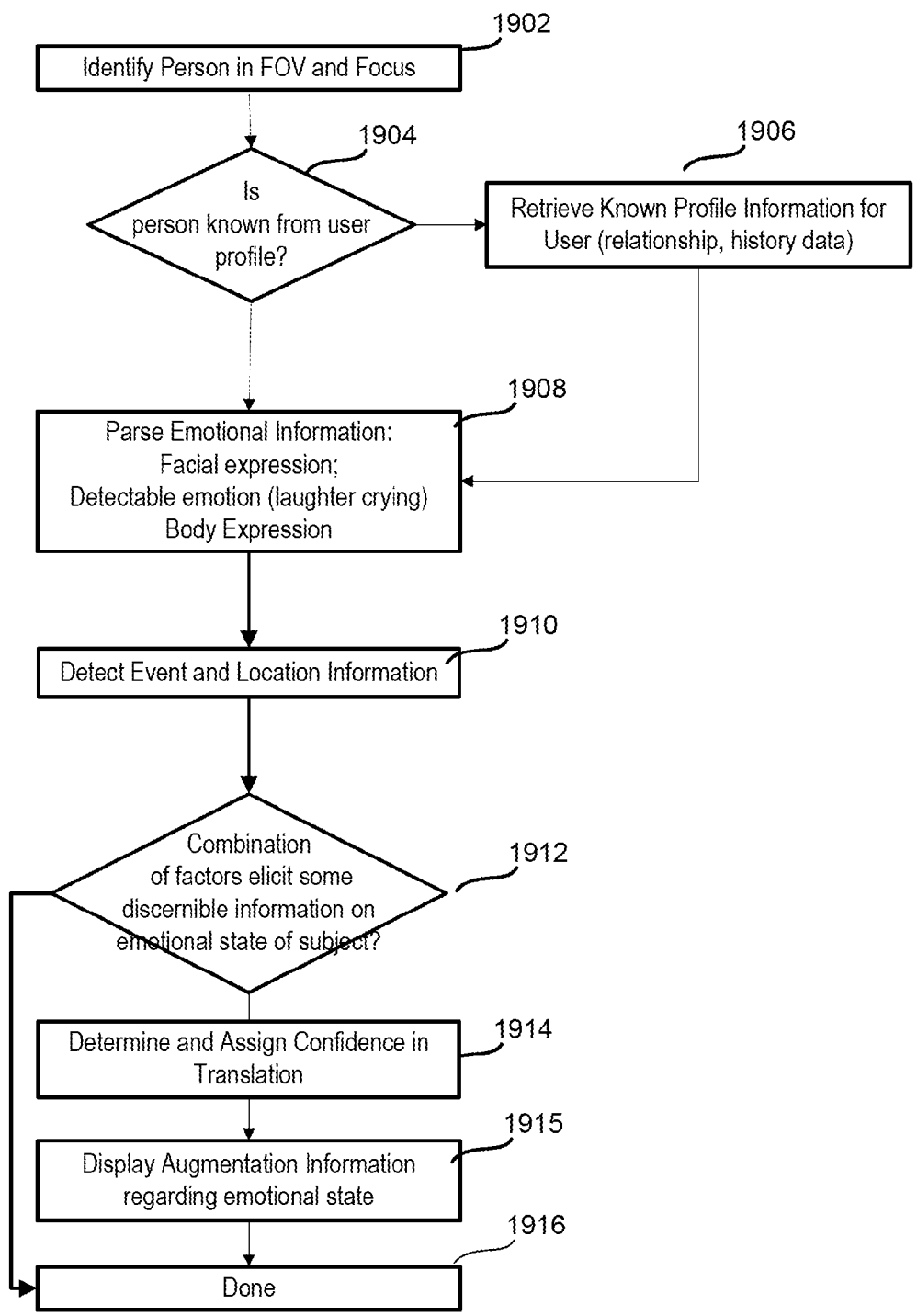
FIG. 19 is a flow chart of a method for performing a context determination.

FIG. 19 illustrates the method for performing a translation in accordance with the description above in FIGS. 18A through 18H. In 1902, the person in the field of view and the focus is identified. In 1904, a determination is made as to whether or not the person is known based on the user's profile. If the person is known then a known profile information for the identified individual including, for example, the history of other determinations made with respect to this user, images of the user, the user's relationship to the wearer, and other information is retrieved at 1906. At 1908 emotional information is parsed to determine a context translation. This can include determining whether the user is laughing or crying, the user's facial expression, and the user's body expression. At 1910, event and location information is retrieved. Context information can be modified based on the knowledge of whether the user is at a specific event or not. For example if a user is at a birthday party and the user is crying, this may indicate that the user is not sad but is actually happy. That is crying can exhibit either happiness or sadness, and the meaning of the emotion can sometimes be tied to the context of the surroundings. In 1912, a determination is made as to whether or not the combination of factors elicit some discernible information on emotional state of the subject. If so, at 1914 a confidence weighting is assigned. Confidence weighting can be higher if the person who is the subject of the translation is known to the user and has a history versus a complete stranger. At 1916, the augmentation information regarding the user's emotional state is displayed.

Returning to FIG. 10, as illustrated at step 1012, feedback on the state of the translation can be provided. In one embodiment, feedback can be provided in a training mode or a training mode can be separately utilized to improve the quality of the translations which are provided by the technology described herein.

Figure 20:
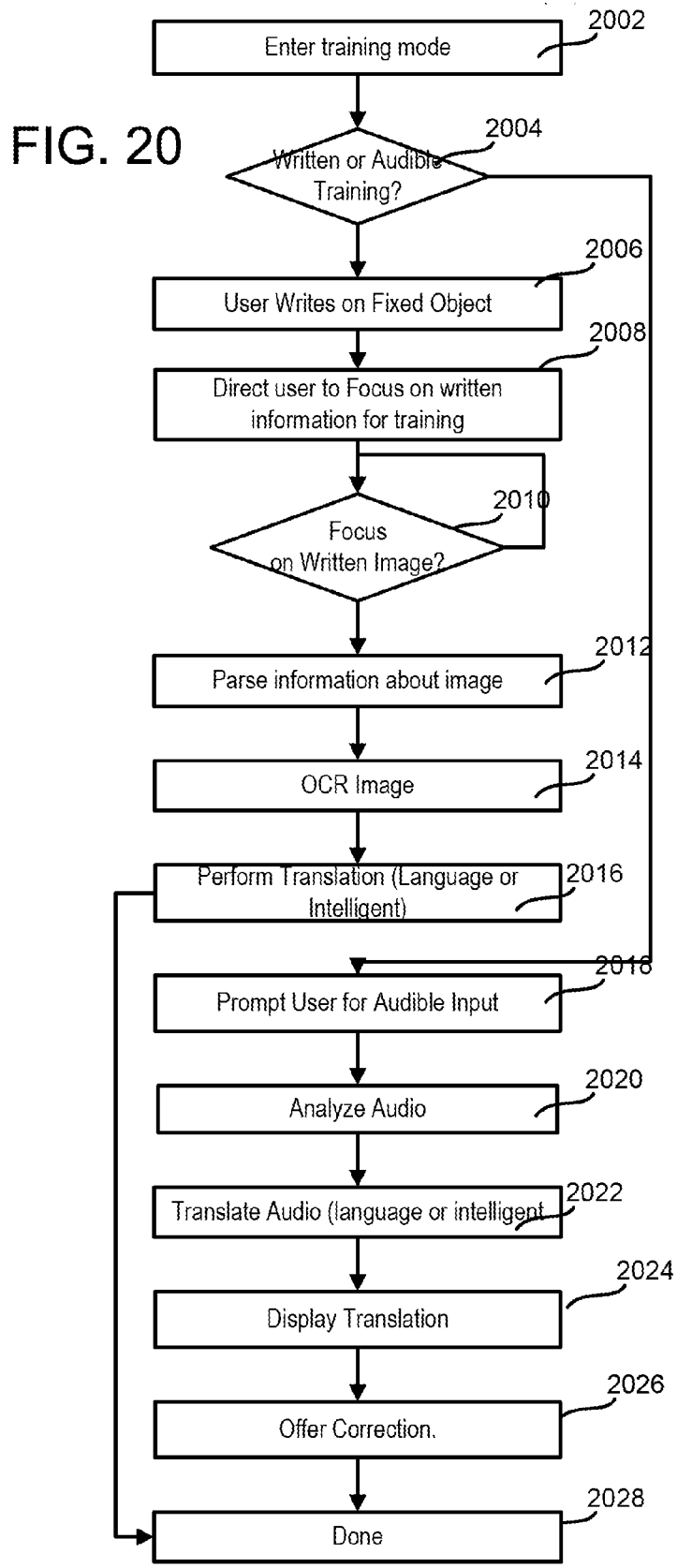
FIG. 20 is a flow chart illustrating a training mode.

FIG. 20 illustrates a method for employing a training mode. At step 2002, training mode is entered. At step 2004, a user makes a selection of whether or not they are entering a written or audible training mode. If a written mode is entered, then at 2006 a user writes on a fixed object and at 2008 the user is directed to focus on the writing which the user has just provided on the fixed object. Steps 2006 and 208 can be performed at the direction of a training prompt provided by the display 2. The direction at 2006 can be a direction to write a specific phrase, or the writing can be random. Once the user is directed to focus on the written information for training at 2008, a determination is made as to whether or not the user has actually focused on the image at 2010 and when the user does focus on the image, the information in the written information on the fixed object is parsed at 2012 and optical character recognition performed at 2014. Translation is performed at 2016 and the translation is displayed at 2024. An offer is made to allow the user to correct the translation at 2026 and additional trainings can be performed at 2028. If an audible training is selected then the user is prompted for audible input at 2018. Again, this can be a prompt for a pre-determined audio enunciation or a random audio enunciation of the user. The verbalized audio is analyzed at 2020 and translated at 2022. Note that the translation of audio or written information can be linguistic, context, or intelligent. Again, at 2024 the translation is displayed or played to the user and correction may be provided at 2026.

Figure 21:
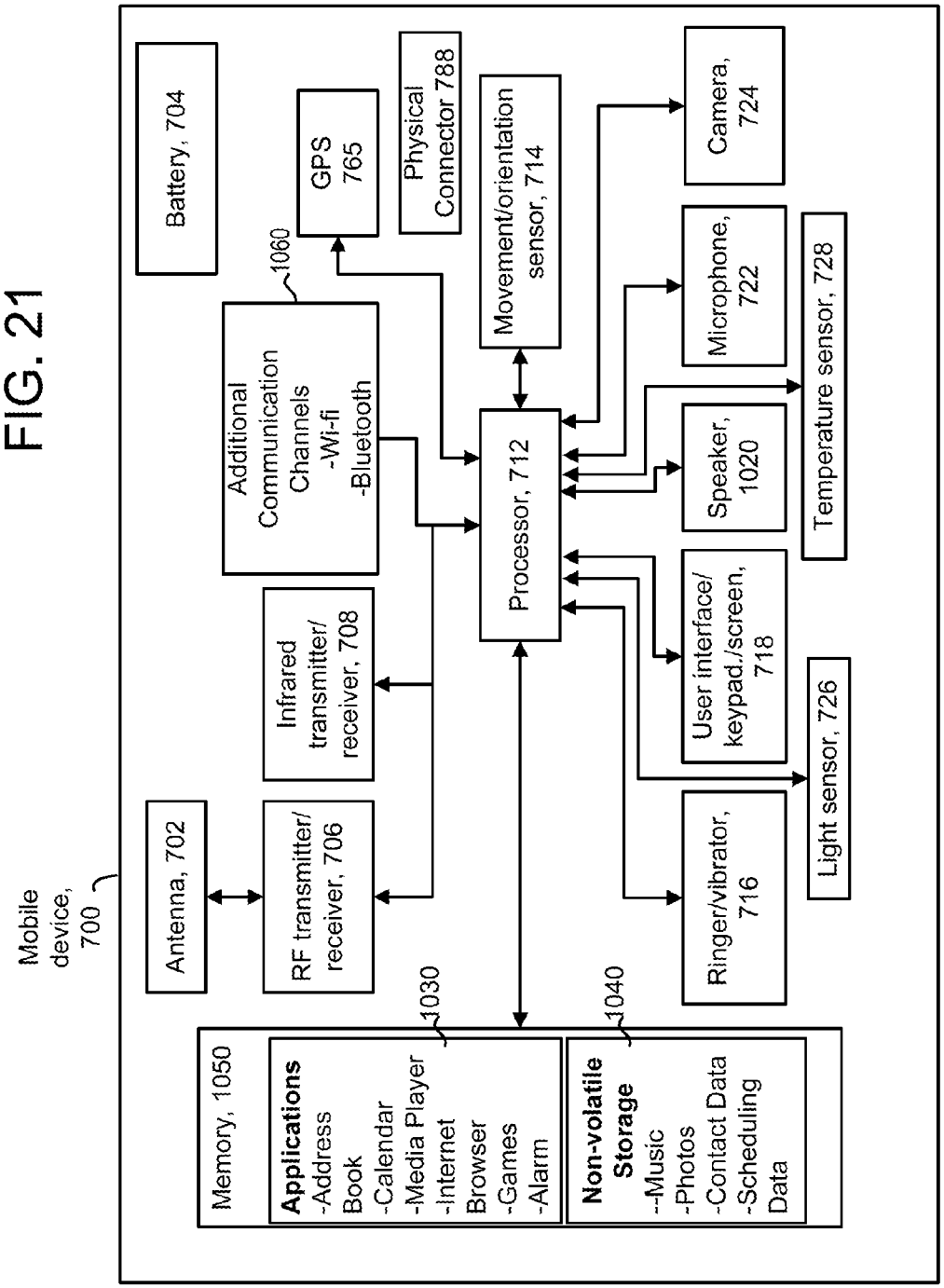
FIG. 21 is a block diagram of an exemplary processing device.

FIG. 21 is a block diagram of an exemplary mobile device which may operate in embodiments of the technology described herein (e.g. device 5). Exemplary electronic circuitry of a typical mobile phone is depicted. The phone 700 includes one or more microprocessors 712, and memory 1010 (e.g., non-volatile memory such as ROM and volatile memory such as RAM) which stores processor-readable code which is executed by one or more processors of the control processor 712 to implement the functionality described herein.

Mobile device 700 may include, for example, processors 712, memory 1050 including applications and non-volatile storage. The processor 712 can implement communications, as well as any number of applications, including the interaction applications discussed herein. Memory 1010 can be any variety of memory storage media types, including non-volatile and volatile memory. A device operating system handles the different operations of the mobile device 700 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an Internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 712 also communicates with RF transmit/receive circuitry 706 which in turn is coupled to an antenna 702, with an infrared transmitted/receiver 708, with any additional communication channels 1060 like Wi-Fi or Bluetooth, and with a movement/orientation sensor 714 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 712 further communicates with a ringer/vibrator 716, a user interface keypad/screen, biometric sensor system 718, a speaker 1020, a microphone 722, a camera 724, a light sensor 726 and a temperature sensor 728.

The processor 712 controls transmission and reception of wireless signals. During a transmission mode, the processor 712 provides a voice signal from microphone 722, or other data signal, to the RF transmit/receive circuitry 706. The transmit/receive circuitry 706 transmits the signal to a remote station (e.g., a fixed station, operator, other cellular phones, etc.) for communication through the antenna 702. The ringer/vibrator 716 is used to signal an incoming call, text message, calendar reminder, alarm clock reminder, or other notification to the user. During a receiving mode, the transmit/receive circuitry 706 receives a voice or other data signal from a remote station through the antenna 702. A received voice signal is provided to the speaker 1020 while other received data signals are also processed appropriately.

Additionally, a physical connector 788 can be used to connect the mobile device 700 to an external power source, such as an AC adapter or powered docking station. The physical connector 788 can also be used as a data connection to a computing device. The data connection allows for operations such as synchronizing mobile device data with the computing data on another device.

A GPS transceiver 765 utilizing satellite-based radio navigation to relay the position of the user applications is enabled for such service.

The example computer systems illustrated in the Figures include examples of computer readable storage media. Computer readable storage media are also processor readable storage media. Such media may include volatile and nonvolatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the desired information and which can accessed by a computer.

Figure 22:
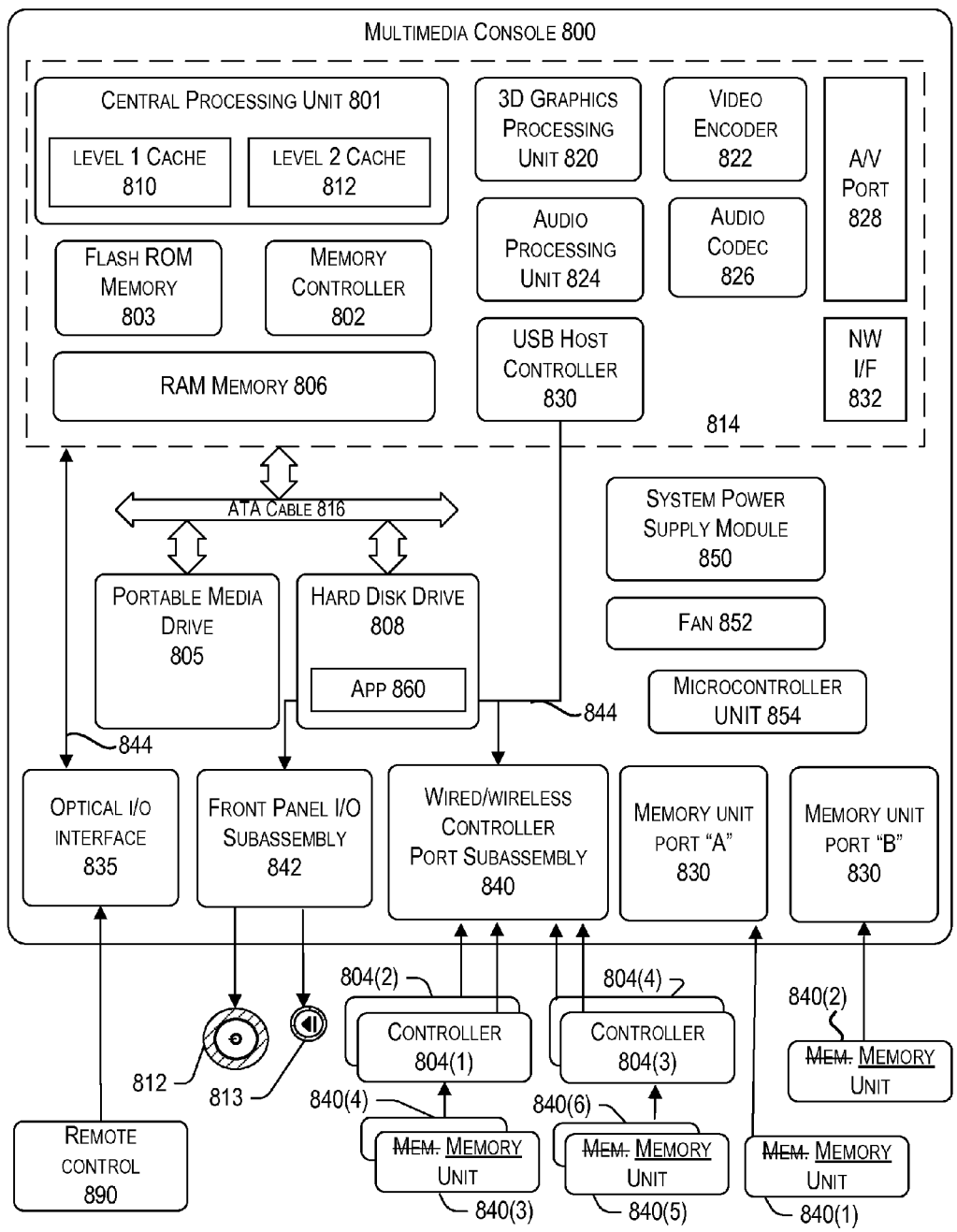
FIG. 22 is a block diagram of another exemplary processing device.

FIG. 22 is a block diagram of one embodiment of a computing system that can be used to implement a hub computing system like that of FIGS. 1A and 1B. In this embodiment, the computing system is a multimedia console 800, such as a gaming console. As shown in FIG. 22, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 806. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA) bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 214.

FIG. 22 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 21 console 800 includes a controller support subassembly 840 for supporting four controllers 804(1)-804(4). The controller support subassembly 840 includes any hardware and software components needed to support wired and wireless operation with an external control device, such as for example, a media and game controller. A front panel I/O subassembly 842 supports the multiple functionalities of power button 812, the eject button 813, as well as any LEDs (light emitting diodes) or other indicators exposed on the outer surface of console 802. Subassemblies 840 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

Memory Units (MUs) 840(1) and 840(2) are illustrated as being connectable to Memory Unit (MU) ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of gaming system 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Gaming and media system 800 may be operated as a standalone system by simply connecting the system to monitor 16 (FIG. 1A), a television, a video projector, or other display device. In this standalone mode, gaming and media system 800 enables one or more players to play games, or enjoy digital media, e.g., by watching movies, or listening to music. However, with the integration of broadband connectivity made available through network interface 832, gaming and media system 800 may further be operated as a participant in a larger network gaming community.

The system described above can be used to add virtual images to a user's view such that the virtual images are mixed with real images that the user see. In one example, the virtual images are added in a manner such that they appear to be part of the original scene. Examples of adding the virtual images can be found U.S. patent application Ser. No. 13/112,919, "Event Augmentation With Real-Time Information," filed on May 20, 2011; and U.S. patent application Ser. No. 12/905,952, "Fusing Virtual Content Into Real Content," filed on Oct. 15, 2010; both applications are incorporated herein by reference in their entirety.

Technology is presented below for augmenting a user experience at various situations. In one embodiment, an information provider prepares supplemental information regarding actions and objects occurring within an event. A user wearing an at least partially see-through, head mounted display can register (passively or actively) their presence at an event or location and a desire to receive information about the event or location. FIG. 22 illustrates a block diagram of a system for implementing the augmenting of the user experience. For example, FIG. 22 shows a personal audio/visual ("A/V") apparatus 902 in communication with a Translation server 903 via one or more networks 906.

In one embodiment, the personal A/V apparatus 902 can be head mounted display device 2 (or other A/V apparatus) in communication with a local processing apparatus (e.g., processing unit 4 of FIG. 1A, mobile device 5 of FIG. 1B or other suitable data processing device). One or more networks 906 can include wired and/or wireless networks, such as a LAN, WAN, WiFi, the Internet, an Intranet, cellular network etc. No specific type of network or communication means is required. In one embodiment, Translation server 903 is implemented in hub computing system 12 (See FIG. 1A). However, Translation server 903 can also be implemented in other types of computing devices (e.g., desktop computers, laptop computers, servers, mobile computing devices, tablet computers, mobile telephones, etc.). Translation server 903 can be implemented as one computing devices or multiple computing devices. In one embodiment, Translation server 903 is located locally to personal A/V apparatus 902 so that they communication over a local area network, WiFi, Bluetooth or other short range communication means. In another embodiment, Translation server 903 is located remotely from personal A/V apparatus 902 so that they communication over the Internet, cellular network or other longer range communication means.

In one embodiment, the personal A/V apparatus 902 can be head mounted display device 2 (or other A/V apparatus) in communication with a local processing apparatus (e.g., processing unit 4 of FIG. 1A, mobile device 5 of FIG. 1B or other suitable data processing device). One or more networks 906 can include wired and/or wireless networks, such as a LAN, WAN, WiFi, the Internet, an Intranet, cellular network etc. No specific type of network or communication means is required.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for presenting a translation of a real world expression to a wearer of a see-through head mounted display apparatus, comprising:

determining a three dimensional location of one or more objects in a field of view of the wearer through the see-through head mounted display apparatus, the determining of the three dimensional location of the object is performed using one or more sensors;

receiving a selection of data for translation in the field of view of the wearer by reference to a gaze of the wearer at the item of data;

analyzing the data for translation to provide input data, the input data having one or more of a linguistic translation input, supplemental information input and contextual input;

analyzing the input data to determine whether each of a linguistic translation, an informational translation, and a context translation should be provided based on the input data and a wearer profile, wherein the linguistic translation is a translation from one language to another, the information translation provides additional information regarding the selected item and the contextual translation is a translation based at least in part on a context of another user providing the input data, wherein the linguistic, informational and context translations are different types of translations;

determining wearer knowledge of subject matter in the analyzed input data from the wearer profile;

determining a complexity of the translation based on the determined wearer knowledge;

determining one of a plurality of output formats for the translation based on the input data;

translating the input data into a translated form for the wearer, the translation based on the determined translation type and the determined translated complexity, the translated form based on the determined one of the plurality of output formats; and rendering the translation in at least one of the plurality of output formats determined, the output format selected from at least an audio translation format and a visual translation format rendered in the see-through head mounted display.

2. The method of claim 1 wherein said step of analyzing the input data to determine whether each of a linguistic translation, an informational translation, and a context translation should be provided determines a context translation should be provided, the method further comprising evaluating the input data relative to the wearer information to determine an accuracy of the context translation, the accuracy so determined being presented to the user.

3. The method of claim 1 wherein the step of translating comprises converting the input data from a first language to a second language.

4. The method of claim 1 wherein the step of translating comprises providing supplemental knowledge for the input data on a subject matter identified in the input data.

5. The method of claim 4 wherein the supplemental knowledge includes a selectable link for the wearer to provide additional supplemental knowledge on the subject matter.

6. The method of claim 1 wherein the step of translating comprises evaluating input data in the form of a person and a context, determining a location of the apparatus, and providing contextual information based on at least the location and the input data.

7. The method of claim 1 further comprising receiving information of an event from user-specific scheduling or profile data, and using information from the event to provide the input data for the translation.

8. The method of claim 1 wherein the sensors include audio sensors and the step of receiving a selection of data includes receiving audio data and analyzing the data including isolating audio data based on the gaze to provide the input data.

9. The method of claim 1 further including a step of providing input data comprising training data from the wearer in written or audio form; performing the receiving, analyzing, translating and rendering steps; and receiving from the wearer a corrected translation of the training data.

10. A method for presenting a translation of information at a location to a wearer of a see-through head mounted display apparatus, comprising:
receiving from the wearer a selection of input data for translation at the location of the wearer;
determining three dimensional locations of objects within a field of view of the wearer at the location;
receiving a selection of input data based on an object within the field of view for translation in the field of view of the wearer;
retrieving wearer profile information bearing on an accuracy of a translation;
analyzing the input data to select a type of translation to perform, the types of translations comprising each of a linguistic translation from a first language to a second language, an informational translation which provides additional information regarding a particular subject or scene in the input data and a context translation which provides information on an emotional state of a person in the field of view should be provided based on the input data, wherein the linguistic, informational and context translations are different types of translations;
determining wearer proficiency in a language of subject matter in the analyzed input data from the wearer profile information;
determining a complexity of the translation based on the determined wearer knowledge;
determining one of a plurality of output formats for the translation;
performing one or more of the linguistic translation, the informational translation or the context translation on the input data based on determining a translation type and the determined translation complexity, the translation based on wearer feedback on translation accuracy of previous translations; and
rendering the translation in at least one of the plurality of output formats, the plurality of output formats comprising an audio output format and a visual output format in the see-through head mounted display.

11. The method of claim 10 wherein an intelligent translation includes determining subject matter in the input data, retrieving supplementation information on the subject matter; determining wearer knowledge of the subject matter from the wearer profile information; determining a complexity of supplemental knowledge information and outputting the information.

12. The method of claim 10 wherein a context translation includes determining bodily characteristics of a person in the field of view of the wearer, determining a context of the person in the field of view of the wearer; and comparing the bodily characteristics and context to known characteristics and contexts to provide an emotional translation of the person in the field of view of the wearer.

13. The method of claim 10 further including a step of rendering the translation output to the wearer and receiving from the wearer a corrected translation of the input data.

* * * * *